US012363690B2

(12) United States Patent
Lin et al.

(10) Patent No.: US 12,363,690 B2
(45) Date of Patent: Jul. 15, 2025

(54) WIRELESS COMMUNICATION METHOD AND USER EQUIPMENT FOR PERFORMING REPETITION-BASED UPLINK TRANSMISSIONS

(71) Applicant: SHARP KABUSHIKI KAISHA, Sakai (JP)

(72) Inventors: Wan-Chen Lin, Taipei (TW); Chia-Hao Yu, Taipei (TW); Hai-Han Wang, Taipei (TW)

(73) Assignee: SHARP KABUSHIKI KAISHA, Sakai (JP)

( * ) Notice: Subject to any disclaimer, the term of this patent is extended or adjusted under 35 U.S.C. 154(b) by 397 days.

(21) Appl. No.: 18/009,517

(22) PCT Filed: Jul. 27, 2021

(86) PCT No.: PCT/CN2021/108641
§ 371 (c)(1),
(2) Date: Dec. 9, 2022

(87) PCT Pub. No.: WO2022/022502
PCT Pub. Date: Feb. 3, 2022

(65) Prior Publication Data
US 2023/0224874 A1 Jul. 13, 2023

Related U.S. Application Data

(60) Provisional application No. 63/057,229, filed on Jul. 27, 2020.

(51) Int. Cl.
*H04W 72/0446* (2023.01)
*H04L 1/08* (2006.01)
*H04W 72/232* (2023.01)

(52) U.S. Cl.
CPC ........... *H04W 72/0446* (2013.01); *H04L 1/08* (2013.01); *H04W 72/232* (2023.01)

(58) Field of Classification Search
CPC .... H04L 1/08; H04W 72/232; H04W 72/0446
(Continued)

(56) References Cited

U.S. PATENT DOCUMENTS

2011/0085516 A1 4/2011 Pajukoski et al.
2019/0053211 A1 2/2019 Ying et al.
(Continued)

FOREIGN PATENT DOCUMENTS

CN 110035514 A 7/2019
CN 111246582 A 6/2020
(Continued)

OTHER PUBLICATIONS

C. Li et al., "5G-Based Systems Design for Tactile Internet," in Proceedings of the IEEE, vol. 107, No. 2, pp. 307-324, Feb. 2019, doi:10.1109/JPROC. 2018. 2864984. Aug. 31, 2018.
(Continued)

*Primary Examiner* — Peter G Solinsky
(74) *Attorney, Agent, or Firm* — ScienBiziP, P.C.

(57) ABSTRACT

A wireless communication method, a User Equipment (UE), and a Base Station (BS) for performing repetition-based Uplink (UL) transmissions are provided. The wireless communication method includes receiving, from the BS, a Radio Resource Control (RRC) message including first information indicating a repetition type, second information indicating a plurality of Transmission Configuration Indicator (TCI) states, and third information including a plurality of items each configuring a Physical Uplink Shared Channel (PUSCH) resource allocation; receiving Downlink Control Information (DCI) that indicates one of the plurality of items; determining a set of nominal PUSCH repetitions; and
(Continued)

transmitting at least one actual PUSCH repetition that is determined based on the set of nominal PUSCH repetitions, wherein each nominal PUSCH repetition in the set of nominal PUSCH repetitions maps to one of the plurality of TCI states.

24 Claims, 8 Drawing Sheets

(58) Field of Classification Search
USPC .......................................................... 370/366
See application file for complete search history.

(56) References Cited

U.S. PATENT DOCUMENTS

| | | | |
|---|---|---|---|
| 2020/0029335 A1 | 1/2020 | Yang et al. | |
| 2020/0106559 A1* | 4/2020 | Vilaipornsawai | H04L 1/1896 |
| 2020/0145999 A1 | 5/2020 | Salah et al. | |
| 2020/0275431 A1 | 8/2020 | Bae et al. | |
| 2021/0219246 A1* | 7/2021 | Xu | H04W 52/146 |
| 2021/0360616 A1* | 11/2021 | Yi | H04W 72/21 |

FOREIGN PATENT DOCUMENTS

| | | |
|---|---|---|
| CN | 111277391 A | 6/2020 |
| CN | 111418248 A | 7/2020 |
| JP | 5792615 B2 | 10/2015 |
| JP | 2021502773 A | 1/2021 |
| WO | 2019093841 A1 | 5/2019 |

OTHER PUBLICATIONS

Ericsson, "PUSCH Enhancements for NR URLLC", R1-1910547, 3GPP TSG RAN WG1 Meeting #98bis, Chongqing, China, Oct. 14-20, 2019 (Oct. 8, 2019).

Huawei, HiSilicon, "Enhancements on multi-TRP/panel transmission", R1-1910073, 3GPP TSG RAN WG1 Meeting #98bis, Chongqing, China, Oct. 14-20, 2019 (Oct. 5, 2019).

Moderator (Apple Inc.), "Final Summary of [101-e-NR-L1enh-URLLC-PUSCH-02] (AI 7.2.5.3)", R1-2004740, 3GPP TSG-RAN WG1 Meeting #101-e, e-Meeting, May 25-Jun. 5, 2020 (Jun. 8, 2020).

Spreadtrum Communications, "Discussion on enhancements on Multi-TRP for PDCCH, PUCCH and PUSCH", R1-2006258, 3GPP TSG RAN WG1 #102-e, e-Meeting, Aug. 17-28, 2020 (Aug. 8, 2020).

Huawei Hisilicon: "Feature Summary of Enhancements on Multi-TRP/Panel Transmission", 3GPP Draft; R1-1911425, 3GPP TSG RAN WG1 Meeting #98bis, Chongqing, China, Oct. 14-20, 2019 (Oct. 22, 2019).

Vivo, "PUSCH enhancements for URLLC", R1-1904083, 3GPP TSG RAN WG1 #96bis, Xi'an, China, Apr. 8-12, 2019, sections 1-3.

Oppo, "Control signaling for multi-TRP based URLLC enhancement", R1-1910119, 3GPP TSG RAN WG1 Meeting #98bis, Chongqing, China, Oct. 14-20, 2019.

* cited by examiner

WIRELESS COMMUNICATION METHOD AND USER EQUIPMENT FOR PERFORMING REPETITION-BASED UPLINK TRANSMISSIONS

CROSS-REFERENCE TO RELATED APPLICATION(S)

The present application is a National Stage Application of International Patent Application Serial No. PCT/CN2021/108641, filed on Jul. 27, 2021, which claims the benefit of and priority to U.S. Provisional Patent Application Ser. No. 63/057,229, filed on Jul. 27, 2020, and entitled "METHOD AND APPARATUS FOR NON-SLOT BASED MULTIPLE TRP OPERATION." The contents of all of the above-mentioned applications are hereby fully incorporated by reference herein for all purposes.

FIELD

The present disclosure generally relates to wireless communications and, more particularly, to a wireless communication method and a User Equipment (UE) for performing repetition-based Uplink (UL) transmissions.

BACKGROUND

With the tremendous growth in the number of connected devices and the rapid increase in user/network traffic volume, various efforts have been made to improve different aspects of wireless communication for the next-generation wireless communication system, such as fifth-generation (5G) New Radio (NR), by improving data rate, latency, reliability, and mobility.

The 5G NR system is designed to provide flexibility and configurability to optimize the network services and types, accommodating various use cases such as enhanced Mobile Broadband (eMBB), massive Machine-Type Communication (mMTC), and Ultra-Reliable and Low-Latency Communication (URLLC).

However, as the demand for radio access continues to increase, there is a need for further improvements in wireless communication for the next-generation wireless communication system.

SUMMARY

The present disclosure is directed to a wireless communication method and a UE for performing repetition-based UL transmissions.

According to a first aspect of the present disclosure, a wireless communication method performed by a UE is provided. The wireless communication method includes receiving a Radio Resource Control (RRC) message from a Base Station (BS). The RRC message includes first information indicating a repetition type that supports more than one repetition transmission within a slot, second information indicating a plurality of Transmission Configuration Indicator (TCI) states configured for the UE, and third information including a plurality of items, each of the plurality of items configuring a Physical Uplink Shared Channel (PUSCH) resource allocation. The wireless communication method further includes receiving Downlink Control Information (DCI) that indicates one of the plurality of items; determining a set of nominal PUSCH repetitions according to the one of the plurality of items, a number of nominal PUSCH repetitions in the set of nominal PUSCH repetitions being indicated by a first parameter included in the one of the plurality of items; and transmitting at least one actual PUSCH repetition that is determined based on the set of nominal PUSCH repetitions, wherein each nominal PUSCH repetition in the set of nominal PUSCH repetitions maps to one of the plurality of TCI states.

In some implementations of the first aspect of the present disclosure, the one of the plurality of items further includes a second parameter that indicates a mapping type between the set of nominal PUSCH repetitions and the plurality of TCI states.

In some implementations of the first aspect of the present disclosure, the mapping type is a cyclic mapping type or a sequential mapping type.

In some implementations of the first aspect of the present disclosure, the wireless communication method further includes determining the at least one actual PUSCH repetition by splitting the set of nominal PUSCH repetitions across at least one slot boundary or across at least one symbol that is considered invalid for Uplink (UL) transmission, wherein: the at least one actual PUSCH repetition includes a first actual PUSCH repetition and a second actual PUSCH repetition, the first actual PUSCH repetition and the second actual PUSCH repetition are split from a same nominal PUSCH repetition in the set of nominal PUSCH repetitions, and the first actual PUSCH repetition and the second actual PUSCH repetition map to a same TCI state of the plurality of TCI states.

In some implementations of the first aspect of the present disclosure, the third information corresponds to a Time Domain Resource Assignment (TDRA) list.

In some implementations of the first aspect of the present disclosure, the UE is further configured with fourth information that indicates a time-domain offset between two neighboring nominal PUSCH repetitions in the set of nominal PUSCH repetitions.

In some implementations of the first aspect of the present disclosure, the time-domain offset is configured by the BS per a nominal PUSCH repetition basis.

In some implementations of the first aspect of the present disclosure, each two neighboring nominal PUSCH repetitions in the set of nominal PUSCH repetitions have a same time-domain offset.

According to a second aspect of the present disclosure, a UE is provided. The UE includes at least one processor and at least one memory coupled to the at least one processor and storing computer-executable instructions that, when executed by the at least one process, cause the UE to receive an RRC message from a BS. The RRC message includes first information indicating a repetition type that supports more than one repetition transmission within a slot, second information indicating a plurality of TCI states configured for the UE, and third information including a plurality of items, each of the plurality of items configuring a PUSCH resource allocation. The computer-executable instructions, when executed by the at least one processor, further cause the UE to receive DCI that indicates one of the plurality of items; determine a set of nominal PUSCH repetitions according to the one of the plurality of items, a number of nominal PUSCH repetitions in the set of nominal PUSCH repetitions being indicated by a first parameter included in the one of the plurality of items; and transmit at least one actual PUSCH repetition that is determined based on the set of nominal PUSCH repetitions, wherein each nominal PUSCH repetition in the set of nominal PUSCH repetitions maps to one of the plurality of TCI states.

In some implementations of the second aspect of the present disclosure, the one of the plurality of items further includes a second parameter that indicates a mapping type between the set of nominal PUSCH repetitions and the plurality of TCI states.

In some implementations of the third aspect of the present disclosure, the mapping type is a cyclic mapping type or a sequential mapping type.

In some implementations of the third aspect of the present disclosure, the computer-executable instructions further cause the UE to: determine the at least one actual PUSCH repetition by splitting the set of nominal PUSCH repetitions across at least one slot boundary or across at least one symbol that is considered invalid for Uplink (UL) transmission, wherein: the at least one actual PUSCH repetition includes a first actual PUSCH repetition and a second actual PUSCH repetition, the first actual PUSCH repetition and the second actual PUSCH repetition are split from a same nominal PUSCH repetition in the set of nominal PUSCH repetitions, and the first actual PUSCH repetition and the second actual PUSCH repetition map to a same TCI state of the plurality of TCI states.

In some implementations of the third aspect of the present disclosure, the third information corresponds to a Time Domain Resource Assignment (TDRA) list.

In some implementations of the third aspect of the present disclosure, the UE is further configured with fourth information that indicates a time-domain offset between two neighboring nominal PUSCH repetitions in the set of nominal PUSCH repetitions.

In some implementations of the third aspect of the present disclosure, the time-domain offset is configured by the BS per a nominal PUSCH repetition basis.

In some implementations of the third aspect of the present disclosure, each two neighboring nominal PUSCH repetitions in the set of nominal PUSCH repetitions have a same time-domain offset.

According to a third aspect of the present disclosure, a Base Station (BS) is provided. The BS includes at least one processor and at least one memory coupled to the at least one processor and storing computer-executable instructions that, when executed by the at least one process, cause the BS to transmit a Radio Resource Control (RRC) message to a User Equipment (UE). The RRC message includes first information indicating a repetition type that supports more than one repetition transmission within a slot, second information indicating a plurality of Transmission Configuration Indicator (TCI) states configured for the UE, and third information including a plurality of items, each of the plurality of items configuring a Physical Uplink Shared Channel (PUSCH) resource allocation. The computer-executable instructions, when executed by the at least one processor, further cause the BS to transmit Downlink Control Information (DCI) that indicates one of the plurality of items, where the UE determines a set of nominal PUSCH repetitions according to the one of the plurality of items, and a number of nominal PUSCH repetitions in the set of nominal PUSCH repetitions is indicated by a first parameter included in the one of the plurality of items; and receive, from the UE, at least one actual PUSCH repetition that is determined based on the set of nominal PUSCH repetitions, wherein each nominal PUSCH repetition in the set of nominal PUSCH repetitions maps to one of the plurality of TCI states.

In some implementations of the third aspect of the present disclosure, the one of the plurality of items further includes a second parameter that indicates a mapping type between the set of nominal PUSCH repetitions and the plurality of TCI states.

In some implementations of the third aspect of the present disclosure, the mapping type is a cyclic mapping type or a sequential mapping type.

In some implementations of the third aspect of the present disclosure, the at least one actual PUSCH repetition includes a first actual PUSCH repetition and a second actual PUSCH repetition; the first actual PUSCH repetition and the second actual PUSCH repetition are split from a same nominal PUSCH repetition in the set of nominal PUSCH repetitions, and the first actual PUSCH repetition and the second actual PUSCH repetition map to a same TCI state of the plurality of TCI states.

In some implementations of the third aspect of the present disclosure, the third information corresponds to a Time Domain Resource Assignment (TDRA) list.

In some implementations of the third aspect of the present disclosure, the computer-executable instructions, when executed by the at least one processor, further cause the BS to configure the UE with fourth information that indicates a time-domain offset between two neighboring nominal PUSCH repetitions in the set of nominal PUSCH repetitions.

In some implementations of the third aspect of the present disclosure, the computer-executable instructions, when executed by the at least one processor, further cause the BS to configure the UE with the time-domain offset per a nominal PUSCH repetition basis.

In some implementations of the third aspect of the present disclosure, each two neighboring nominal PUSCH repetitions in the set of nominal PUSCH repetitions have a same time-domain offset.

BRIEF DESCRIPTION OF THE DRAWINGS

Aspects of the example disclosure are best understood from the following detailed description when read with the accompanying figures. Various features are not drawn to scale. Dimensions of various features may be arbitrarily increased or reduced for clarity of discussion.

DETAILED DESCRIPTION

Figure 1:
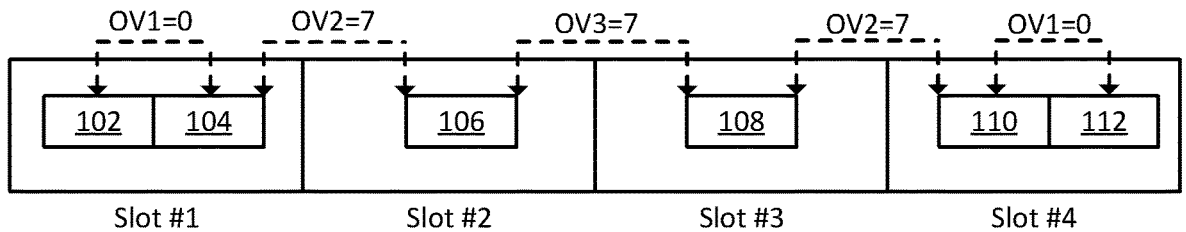
FIG. 1 is a diagram illustrating different offset values configured for different repetition schemes, according to an example implementation of the present disclosure.

The following contains specific information related to implementations of the present disclosure. The drawings and their accompanying detailed description are merely directed to implementations. However, the present disclosure is not limited to these implementations. Other variations and implementations of the present disclosure will be obvious to those skilled in the art.

Unless noted otherwise, like or corresponding elements among the drawings may be indicated by like or corresponding reference numerals. Moreover, the drawings and illustrations in the present disclosure are generally not to scale and are not intended to correspond to actual relative dimensions.

For consistency and ease of understanding, like features may be identified (although, in some examples, not illustrated) by the same numerals in the drawings. However, the features in different implementations may differ in other respects and shall not be narrowly confined to what is illustrated in the drawings.

The phrase "in some implementations" may refer to one or more of the same or different implementations. The term "coupled" is defined as connected, whether directly or indirectly via intervening components, and is not necessarily limited to physical connections. The term "comprising" means "including, but not necessarily limited to" and specifically indicates open-ended inclusion or membership in the disclosed combination, group, series, or equivalent. The expression "at least one of A, B and C" or "at least one of the following: A, B and C" means "only A, or only B, or only C, or any combination of A, B and C."

The terms "system" and "network" may be used interchangeably. The term "and/or" is only an association relationship for disclosing associated objects and represents that three relationships may exist such that A and/or B may indicate that A exists alone, A and B exist at the same time, or B exists alone. "A and/or B and/or C" may represent that at least one of A, B, and C exists. The character "/" generally represents that the associated objects are in an "or" relationship.

For the purposes of explanation and non-limitation, specific details, such as functional entities, techniques, protocols, standards, and the like, are set forth for providing an understanding of the disclosed technology. In other examples, detailed disclosures of well-known methods, technologies, systems, architectures, and the like are omitted so as not to obscure the present disclosure with unnecessary details.

Persons skilled in the art will immediately recognize that any disclosed network function(s) or algorithm(s) may be implemented by hardware, software, or a combination of software and hardware. Disclosed functions may correspond to modules which may be software, hardware, firmware, or any combination thereof.

A software implementation may include computer-executable instructions stored on a computer-readable medium, such as memory or other type of storage devices. One or more microprocessors or general-purpose computers with communication processing capability may be programmed with corresponding computer-executable instructions and perform the disclosed network function(s) or algorithm(s).

The microprocessors or general-purpose computers may include Application-Specific Integrated Circuits (ASICs), programmable logic arrays, and/or one or more Digital Signal Processors (DSPs). Although some of the disclosed implementations are oriented to software installed and executing on computer hardware, alternative implementations implemented as firmware, as hardware, or as a combination of hardware and software are well within the scope of the present disclosure. The computer-readable medium may include, but is not limited to, Random Access Memory (RAM), Read-Only Memory (ROM), Erasable Programmable Read-Only Memory (EPROM), Electrically Erasable Programmable Read-Only Memory (EEPROM), flash memory, Compact Disc Read-Only Memory (CD-ROM), magnetic cassettes, magnetic tape, magnetic disk storage, or any other equivalent medium capable of storing computer-readable instructions.

A radio communication network architecture such as a Long-Term Evolution (LTE) system, an LTE-Advanced (LTE-A) system, an LTE-Advanced Pro system, or a 5G NR Radio Access Network (RAN) may typically include at least one base station (BS), at least one UE, and one or more optional network elements that provide connection within a network. The UE may communicate with the network such as a Core Network (CN), an Evolved Packet Core (EPC) network, an Evolved Universal Terrestrial RAN (E-UTRAN), a Next-Generation Core (NGC), a 5G Core (5GC), or an internet via a RAN established by one or more BSs.

A UE may include, but is not limited to, a mobile station, a mobile terminal or device, or a user communication radio terminal. The UE may be a portable radio equipment that includes, but is not limited to, a mobile phone, a tablet, a wearable device, a sensor, a vehicle, or a Personal Digital Assistant (PDA) with wireless communication capability. The UE may be configured to receive and transmit signals over an air interface to one or more cells in a RAN.

The BS may be configured to provide communication services according to at least a Radio Access Technology (RAT) such as Worldwide Interoperability for Microwave Access (WiMAX), Global System for Mobile communications (GSM) that is often referred to as 2G, GSM Enhanced Data rates for GSM Evolution (EDGE) RAN (GERAN), General Packet Radio Service (GPRS), Universal Mobile Telecommunication System (UMTS) that is often referred to as 3G based on basic Wideband-Code Division Multiple Access (W-CDMA), High-Speed Packet Access (HSPA), LTE, LTE-A, evolved/enhanced LTE (eLTE) that is LTE connected to 5GC, NR (often referred to as 5G), and/or LTE-A Pro. However, the scope of the present disclosure is not limited to these protocols.

The BS may include, but is not limited to, a node B (NB) in the UMTS, an evolved node B (eNB) in LTE or LTE-A, a radio network controller (RNC) in UMTS, a BS controller (BSC) in the GSM/GERAN, a next-generation eNB (ng-eNB) in an Evolved Universal Terrestrial Radio Access (E-UTRA) BS in connection with 5GC, a next-generation Node B (gNB) in the 5G-RAN (or in the 5G Access Network (5G-AN)), or any other apparatus capable of controlling radio communication and managing radio resources within a cell. The BS may serve one or more UEs via a radio interface.

The BS may provide radio coverage to a specific geographical area using a plurality of cells included in the RAN. The BS may support the operations of the cells. Each cell may be operable to provide services to at least one UE within its radio coverage.

Each cell (often referred to as a serving cell) may provide services to serve one or more UEs within its radio coverage such that each cell schedules the downlink (DL) and optionally uplink (UL) resources to at least one UE within its radio coverage for DL and optionally UL packet transmissions. The BS may communicate with one or more UEs in the radio communication system via the plurality of cells.

A cell may allocate Sidelink (SL) resources for supporting Proximity Service (ProSe), LTE SL services, and/or LTE/NR Vehicle-to-Everything (V2X) services. Each cell may have overlapped coverage areas with other cells.

It should be noted that even though the mechanisms described above and below are mostly described with regard to PUSCH transmissions, the described mechanisms may be applicable to other types of channels, such as Physical Downlink Shared Channel (PDSCH) scheduling. On the other hand, a TCI state may refer to the information related to a UL beam/panel.

NR supports DL transmission of the same (NR-)PDSCH data stream(s) from multiple Transmission/Reception Points (TRPs) at least with an ideal backhaul, and different NR-PDSCH data streams from multiple TRPs with an ideal backhaul and a non-ideal backhaul. An ideal backhaul enables using a single Physical Downlink Control Channel (PDCCH) from one TRP to schedule data transmissions from multiple TRPs, whereas a non-ideal backhaul may require multiple PDCCHs with each TRP having one PDCCH for scheduling the corresponding data transmission. In 3GPP NR Specification Release 15 (Rel-15), a scalable and flexible Multiple-Input-Multiple-Output (MIMO) framework is used. For example, beam management operations and flexible Channel State Information (CSI) acquisition are supported. In a NR Rel-16 Work Item, to achieve the objectives of increased robustness, lower overhead, and lower latency, enhancements on Multi-User-MIMO (MU-MIMO) support multi-TRP/panel transmission including improved reliability and robustness with both ideal and non-ideal backhauls, and multi-beam operations which are primarily targeting Frequency Range 2 (FR2) operations are implemented.

A UE may be configured with a list up to M (e.g., 64 or 128) TCI state configurations, in which each TCI state contains parameters for configuring at least one quasi co-location (QCL) relationship between one or two downlink reference signals and the Demodulation Reference Signal (DM-RS) ports of the PDSCH, the DM-RS port of PDCCH, or the CSI Reference Signal (CSI-RS) port(s) of a CSI-RS resource. The QCL types corresponding to each DL RS may be given by the higher layer parameter qcl-Type in the parameter QCL-Info. There are four QCL types listed below:
  'QCL-TypeA': {Doppler shift, Doppler spread, average delay, delay spread}
  'QCL-TypeB': {Doppler shift, Doppler spread}
  'QCL-TypeC': {Doppler shift, average delay}
  'QCL-TypeD': {Spatial Rx parameter}.

When signals transmitted from different antenna ports experience radio channels having common properties, the transmitted signals are considered as being quasi co-located (QCLed) with each other. For example, if two signals/channels are quasi co-located with each other via QCL-TypeA, it means the two signals/channels go through similar radio channels sharing similar properties in terms of Doppler shift, Doppler spread, average delay, and delay spread. If the two signals/channels are quasi co-located with each other via QCL-TypeB, it means the two signals/channels experience similar radio channels sharing similar properties in terms of Doppler shift and Doppler spread. If the two signals/channels are quasi co-located with each other via QCL-TypeC, it means the two signals/channels experience similar radio channels sharing similar properties in terms of Doppler shift and average delay. If the two signals/channels are quasi co-located with each other via QCL-TypeD, it means the two signals/channels experience similar radio channels sharing similar properties in terms of a Spatial Receive (Rx) parameter. The QCL concept is used to help the UE with channel estimation, frequency offset error estimation, and synchronization procedures.

In NR Rel-16, the multi-TRP deployment for the URLLC scenario exhibits how multiple TRPs enhance the reliability by replicating transmissions. One reason for the reliability enhancement is that if one TRP is blocked, the UE can still receive the signal from another TRP. Besides, at most two panels/TRPs may be used for simultaneous multi-panel/TRP reception. Several multi-TRP-related schemes which may be scheduled by single DCI for URLLC are described as follows:

Scheme 1 (Space Division Multiplexing (SDM)): n TCI states are applied within a single time slot, with overlapped time and frequency resource allocation for PDSCH transmission, where n is a positive integer.

Scheme 2a (Frequency Division Multiplexing (FDM)): n TCI states are applied within a single time slot, with non-overlapped frequency resource allocation for PDSCH transmission. In Scheme 2a, each non-overlapped frequency resource allocation may be associated with one TCI state. The same single/multiple DMRS ports may be associated with all non-overlapped frequency resource allocations. A single codeword with one redundancy version (RV) may be used across the full resource allocation. From UE perspective, the common Resource Block (RB) mapping may be applied across the full resource allocation.

Scheme 2b (FDM): n TCI states are applied within a single slot, with non-overlapped frequency resource allocation. Each non-overlapped frequency resource allocation may be associated with one TCI state. The same single/multiple DMRS ports may be associated with all non-overlapped frequency resource allocations. A single codeword with one RV may be used for each non-overlapped frequency resource allocation. The RVs corresponding to each non-overlapped frequency resource allocation can be the same or different.

Scheme 3 (TDM Scheme A): n TCI states are applied within a single slot, with non-overlapped time resource allocation. Each transmission occasion of the Transport Block (TB) may have one TCI and one RV with the time granularity of mini-slot. All transmission occasion(s) within the slot may use a common Modulation and Coding Scheme (MCS) with the same single or multiple DMRS port(s). The RV/TCI state can be the same or different among transmission occasions.

Scheme 4 (TDM Scheme B): n TCI states applied to K (n≤K) different slots. Each transmission occasion of the TB has one TCI and one RV. All transmission occasion(s) across K slots may use a common MCS with the same single or multiple DMRS port(s). The RV/TCI state can be the same or different among transmission occasions.

A slot-based repetition scheme may refer to a scheme in which each repetition is performed according to a slot structure, and a non-slot-based repetition scheme may refer to a scheme in which the repetition is performed regardless of the slot structure. In other words, the non-slot-based repetition scheme allows more than one repetition within a single time slot, whereas the slot-based repetition scheme does not.

A non-slot-based repetition scheme may also be referred to as "repetition type B." For repetition type B, the nominal repetitions are contiguous in that each subsequent nominal repetition begins at the first symbol, or an offset value, after the last symbol of the previous nominal repetition. Based on repetition type B, it is possible that a nominal repetition may cross a slot boundary. The number of nominal repetitions may be given by the RRC signaling, and the number of actual repetitions may be determined by RRC signaling and the number of slot boundaries or/and UL/DL switches within a slot. Thus, in some cases, the number of actual repetitions may be greater than the number of nominal repetitions.

It is noted that a "nominal repetition" is the repetition for which the UE receives a UL grant, whereas an "actual repetition" is a segment of a nominal repetition that is actually transmitted by the UE. For example, for a nominal repetition spanning across a slot boundary, the nominal repetition may be split into two actual repetitions by the slot boundary from the UE's perspective. For example, for a nominal repetition spanning across an invalid symbol for transmission (e.g., a DL symbol, if the nominal repetition is a UL repetition, such as a PUSCH repetition), the nominal repetition may also be split into two actual repetitions by the invalid symbol from the UE's perspective. A nominal/actual repetition may refer to a nominal/actual PUSCH repetition. In the present disclosure, a repetition may refer to either a "nominal repetition" or an "actual repetition," unless otherwise stated. Moreover, a repetition may be a UL-based repetition or a DL-based repetition. For example, a repetition may be a PUSCH repetition. In the present disclosure, a repetition may refer to a transmission occasion for a nominal repetition or an actual repetition.

The mechanism of PUSCH repetition in the multi-TRP scenario may be implemented based on a dedicated configuration (e.g., RepetitionSchemeConfig) or follow the PUSCH configuration for the non-slot-based repetition scheme. In some implementations, the configuration/signaling applied to the mechanism of PDSCH repetition may also be applicable to the mechanism of PUSCH repetition for multi-TRP operations.

When the methodology of TCI states mapping applied to multi-TRP-based PDSCH repetition is applied to multi-TRP-based PUSCH repetition, it would be required to map the TCI state(s) to each transmission occasion of a UL TB (e.g., TCI cycling) since the number of actual repetitions may be different from the number of nominal repetitions (depending on whether or not the nominal repetitions cross a slot boundary or an invalid symbol). For Scheme 3 for PDSCH repetition described previously, the UE may not be expected to receive a repetition that crosses a slot boundary. Thus, it would be required to determine a mapping pattern of TCI states indicated by a TCI codepoint for a PUSCH repetition if a nominal repetition is separated into two actual repetitions. The mapping pattern may refer to a TCI-state mapping order, which may be implemented by mapping one or more TCI states to PUSCH repetition transmissions.

On the other hand, for a multi-TRP PDSCH repetition operation, the parameter startingsymboloffsetK may be used to configure the starting symbol of the second transmission occasion which is K symbol(s) after the last symbol of the first transmission occasion within a slot. In other words, the parameter startingsymboloffsetK determines an offset (e.g., K symbol(s)) between the last symbol of the first transmission occasion and the starting symbol of the second transmission occasion in a slot. However, for a PUSCH repetition, the offsets between any two neighboring repetitions may not be the same. Therefore, the mechanism suitable for transmitting PUSCH repetitions under the situation of non-uniform offset distribution may be needed.

Moreover, in NR systems, simultaneously configuring Scheme 3 (e.g., TDM scheme A) and Scheme 4 (TDM scheme B) may not be allowed in the operation of multi-TRP PDSCH repetitions. However, to enable a more flexible and reliable PUSCH transmission, it would be required to allow a UE to be configured with the non-slot-based repetition scheme and the slot-based repetition scheme at the same time.

As described above, the present disclosure provides a mechanism for UL-based repetition (e.g., PUSCH repetition) that is more flexible and better fits the requirements of certain 5G scenario(s) (e.g., multi-TRP).

A Dedicated Configuration for Multi-TRP PUSCH Repetition

In some implementations, the UE may be provided with a dedicated configuration for PUSCH repetition that includes the parameter(s) for configurating the slot-based repetition scheme (or "slot-based parameter(s)" for short) and the parameter(s) for configuring the non-slot-based repetition scheme (or "non-slot-based parameter(s)" for short). In other words, once the UE receives the dedicated configuration, the UE is configured with two different repetition schemes: the slot-based repetition scheme and the non-slot-based repetition scheme. In some implementations, the slot-based parameter(s) and/or the non-slot-based parameter(s) may be implemented as Information Element(s) (IE(s)).

The dedicated configuration that includes the slot-based parameters and the non-slot-based parameters may be considered as an explicit indication from the network for configuring the UE with the slot-based repetition scheme and the non-slot-based repetition scheme. In some implementations, the slot-based parameter(s) may include the parameter RepTypeA or SlotBased, whereas the non-slot-based parameter(s) may include the parameter RepTypeB or NonslotBased.

In some other implementations, one or more specific parameters may be used as an implicit indication that configures the UE with the corresponding repetition schemes. The parameters may correspond to different repetition schemes. For example, a first set of the parameters may correspond to the slot-based repetition scheme and a second set of the parameters may correspond to the non-slot-based repetition scheme.

In some other implementations, different repetition schemes may have different numbers of nominal repetitions. For example, a UE may be configured with the parameter RepNumTypeA that indicates the number of nominal repetitions for the slot-based repetition scheme, and/or configured with the parameter RepNumTypeB that indicates the number of nominal repetitions for the non-slot-based repetition scheme.

In some implementations, different repetition schemes may have different TCI state mapping orders. For example, a UE may be configured with the parameter TCImappingTypeA that indicates the TCI state mapping order for the slot-based repetition scheme, and/or configured with the parameter TCImappingTypeB that indicates the TCI state mapping order for the non-slot-based repetition scheme.

In some implementations, different repetition schemes may correspond to different Time Domain Resource Allocation (TDRA) lists. For example, a UE may be configured with a first TDRA list for the slot-based repetition scheme and configured with a second TDRA list for the non-slot-based repetition scheme. A TDRA list may include several items (or "entries" or "rows"), with each item indicating a set of resource-allocation-related parameters including at least one of an item index, a mapping type, a slot offset(s) (K1 and/or K2), a starting symbol(S), an allocation length (L), and the number of (nominal) repetitions.

In some implementations, the UE may transmit a capability message to the network. The capability message may indicate a capability of the UE to support switching between different repetition schemes.

Offset Value Between Each Repetition

In some aspects of the present disclosure, the UE may be configured with several parameters that indicate the offset value between each two neighboring repetitions, the TCI state mapping orders, and the number of nominal repetitions.

In some implementations, different offset values indicated by the parameter(s) may be in different time units. For example, the time unit of one of the offset values may be in symbols, whereas the time unit of another one of the offset values may be in slots or sub-slots.

FIG. 1 is a diagram illustrating different offset values configured for different repetition schemes, according to an example implementation of the present disclosure.

In the present implementation, the UE applies the non-slot-based repetition scheme and the slot-based repetition scheme in different time slots. As illustrated in FIG. 1, the non-slot-based repetition scheme is applied in slots #1 and #4, and the slot-based repetition scheme is applied in slots #2 and #3. In slot #1, repetitions 102 and 104 are continuous (or consecutive) in that the last symbol of repetition 102 is followed by the first symbol of repetition 104. In other words, the offset value OV1 between the two neighboring repetitions 102 and 104 is "0." Next to repetition 104, repetitions 106 and 108 are transmitted, based on the slot-based repetition scheme, in slots #2 and #3. The offset value between two neighboring repetitions under different repetition schemes is OV2, which is set to "7" symbols in the example implementation.

Then, as described previously, different repetition schemes may apply different offset values for two neighboring repetitions. As illustrated in FIG. 1, since the repetition scheme is switched from "non-slot based" to "slot-based" in slots #2 and 3, a new offset value OV3 (e.g., 7 symbols) is applied. During the transition from slot #3 to slot #4, the repetition scheme goes back to the non-slot-based repetition scheme, and thus the offset value between repetitions 108 and 110 is OV2, which is "7" symbols in the example implementation. In slot #4, repetitions 110 and 112 are consecutive in that the first symbol of repetition 112 is right after the last symbol of repetition 110. That is, the offset value between repetitions 110 and 112 is OV1, which is "0" symbols in the example implementation.

In some implementations, the UE may be configured with a parameter (e.g., startingSymbolOffsetK1) to indicate an offset value (e.g., OV1 in FIG. 1) between two neighboring repetitions both for the non-slot-based repetition scheme, a parameter (e.g., startingSymbolOffsetK2) to indicate an offset value (e.g., OV2 in FIG. 1) between two neighboring repetitions for different repetition schemes, and/or a parameter (e.g., startingSymbolOffsetK3) to indicate an offset value (e.g., OV3 in FIG. 1) between two neighboring repetitions for the slot-based repetition scheme.

In some implementations, the offset values between each two neighboring repetitions for the slot-based repetition scheme may be "fixed values." That is, the offset values configured for the slot-based repetition scheme may be the same. In some other implementations, the offset values between each two neighboring repetitions for the non-slot-based repetition scheme may be "varied values."

Figure 2:
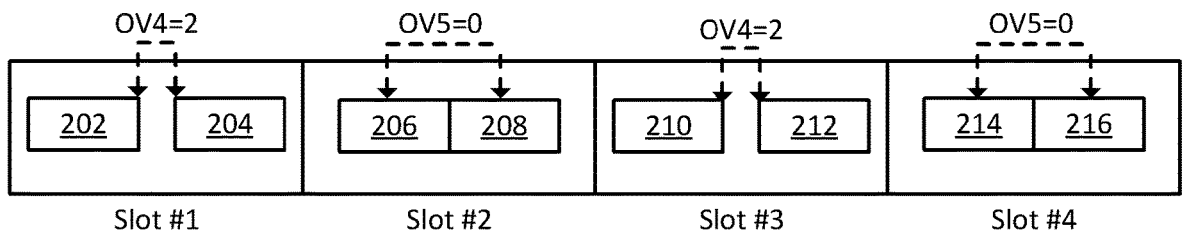
FIG. 2 is a diagram illustrating different offset values configured for the non-slot-based repetition scheme, according to an example implementation of the present disclosure.

FIG. 2 is a diagram illustrating different offset values configured for the non-slot-based repetition scheme, according to an example implementation of the present disclosure. As illustrated in FIG. 2, the offset value OV4 between repetitions 202 and 204 in slot #1 is "2" symbols. In slot #2, the offset value OV5 between repetitions 206 and 208 changes to "0" symbols. The same pattern of offset distribution as that applied in slots #1 and #2 may also be applied in the next two slots #3 and #4. For example, in slot #3, the offset value OV4 may be applied between repetitions 210 and 212. In slot #4, the offset value OV5 may be applied between repetitions 214 and 216. In other words, in some implementations, the offset values between each two neighboring repetitions for the non-slot-based repetition scheme may vary per a slot basis.

Figure 3:
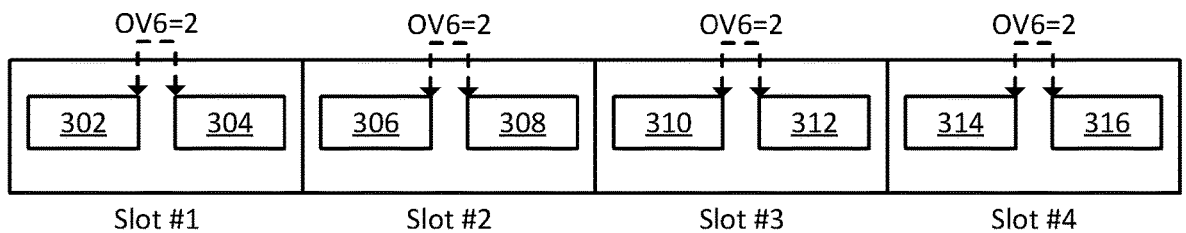
FIG. 3 is a diagram illustrating a non-slot-based repetition scheme in which a fixed offset value is applied, according to an example implementation of the present disclosure.

FIG. 3 is a diagram illustrating a non-slot-based repetition scheme in which a fixed offset value is applied, according to an example implementation of the present disclosure. As illustrated in FIG. 3, the offset value OV6 between two neighboring repetitions in a slot (e.g., repetitions 302 and 304 in slot #1, repetitions 306 and 308 in slot #2, repetitions 310 and 312 in slot #3, or repetitions 314 and 316 in slot #4) is fixed (e.g., "2" symbols).

It should be noted that the values of OV1, OV2, OV3, OV4, OV5, and OV6 described above, as well as other offset value(s) described in the present disclosure, are for illustrative purposes only and not for limiting the scope of the present disclosure. The offset value(s) can be arbitrary, depending on the network's configuration or UE implementation. In some implementations, the offset value(s) may be fixed value(s) when a certain repetition scheme (e.g., a non-slot-based repetition scheme or a slot-based repetition scheme) is applied. In some implementations, the offset value(s) may be varied value(s) when a certain repetition scheme (e.g., a non-slot-based repetition scheme or a slot-based repetition scheme) is applied. The offset value(s) may be configured by Radio Resource Control (RRC), Downlink Control Information (DCI), or/and Medium Access Control (MAC)-Control Element (CE) signaling.

The Number of Repetitions

In some aspects of the present disclosure, various ways of configuring a UE with the number of repetitions for different repetition schemes are provided. Details of the mechanism are described with reference to FIGS. 4 and 5.

Figure 4:
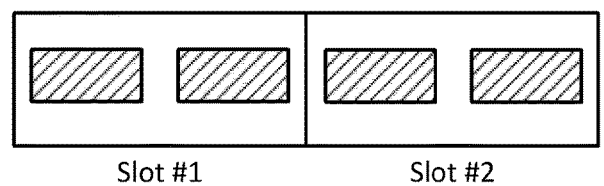
FIG. 4 is a diagram illustrating different repetition schemes that share a common parameter that indicates the number of repetitions, according to an example implementation of the present disclosure.

FIG. 4 is a diagram illustrating different repetition schemes that share a common parameter that indicates the number of repetitions, according to an example implementation of the present disclosure. In the present implementation, the parameter RepNum is common for both the slot-based repetition scheme and the non-slot-based repetition scheme. For example, if RepNum=2, the number of repetitions for the slot-based repetition scheme and the number of repetitions for the non-slot-based repetition scheme may have the same value "2." In this case, a UE may know that there should be two repetitions (each represented by a rectangle with diagonal lines) in one slot, and such a slot-based repetition pattern should be implemented in two consecutive slots (e.g., slots #1 and #2). The parameter RepNum may be indicated/configured by RRC, MAC-CE, and/or DCI signaling.

Figure 5:
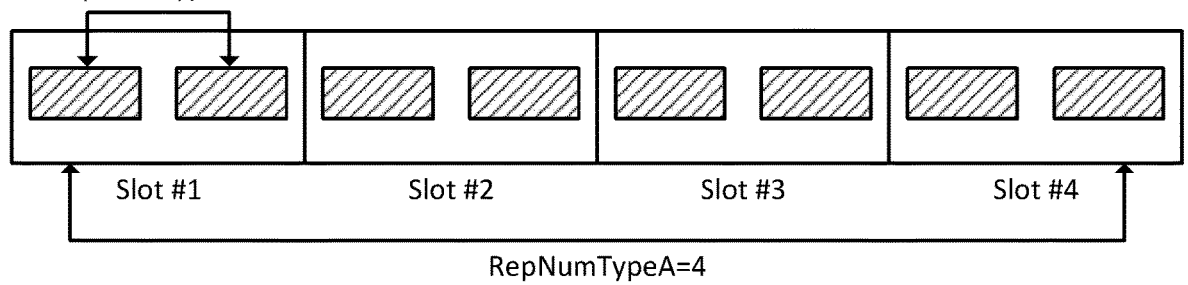
FIG. 5 is a diagram illustrating different repetition schemes that apply separate parameters each indicating a corresponding number of repetitions, according to an example implementation of the present disclosure.

FIG. 5 is a diagram illustrating different repetition schemes that apply separate parameters each indicating a corresponding number of repetitions, according to an example implementation of the present disclosure. In the present implementation, the number of repetitions for the slot-based repetition scheme is determined by the parameter RepNumTypeA, and the number of repetitions for the non-slot-based repetition scheme is determined by the parameter RepNum TypeB. If RepNumTypeA=4 and RepNumTypeB=2, the UE may know that there should be two repetitions (each represented by a rectangle with diagonal lines) in one slot, and such a slot-based repetition pattern should be implemented in four continuous slots (e.g., slots #1, #2, #3 and #4). Each of the parameter RepNumTypeA and the parameter RepNumTypeB may be indicated/configured by RRC, MAC-CE, and/or DCI signaling. For example, the parameters RepNumTypeA and RepNumTypeB may be implemented in two separate RRC parameters, two separate MAC-CEs, or two separate DCI fields.

In some other implementations, the number of repetitions may be determined by (1) the number of TCI states configured for a TB and (2) the parameter RepNumTypeA and/or the parameter RepNumTypeB described above. For example, the number of TCI states configured for a TB is 2 (e.g., TCI state #1 and TCI state #2), and the indicator (e.g., RepNumTypeA or RepNumTypeB) is equal to 4; thus, the total number of repetitions may be equal to 8 which is determined by 2 multiplied by 4.

TCI State Mapping Order

In some aspects of the present disclosure, a UE may be configured with a parameter that indicates a TCI state mapping order of the repetitions for a certain repetition scheme. For example, the UE may be configured with a parameter #1 for the slot-based repetition scheme and a parameter #2 for the non-slot-based repetition scheme. When the slot-based repetition scheme is applied, the UE may apply the TCI state mapping order indicated by the parameter #1. When the non-slot-based repetition scheme is applied, the UE may apply the TCI state mapping order indicated by the parameter #2.

There are many types of TCI state mapping order, including a sequential mapping type and a cyclic mapping type. The sequential mapping type may refer to a TCI state mapping order for which a certain set of sequential repetitions may apply the same TCI state, the next set of sequential repetitions may apply another TCI state, and so on. In other words, for the sequential mapping type, a certain number of sequential repetitions may apply the same TCI state. The cyclic mapping type may refer to a TCI state mapping order for which a certain TCI state mapping pattern of the repetitions occurs in cycles. It should be noted that if the offset value between two sequential/neighboring repetitions is "0," these two sequential repetitions are considered "consecutive" in the time domain.

Figure 6:
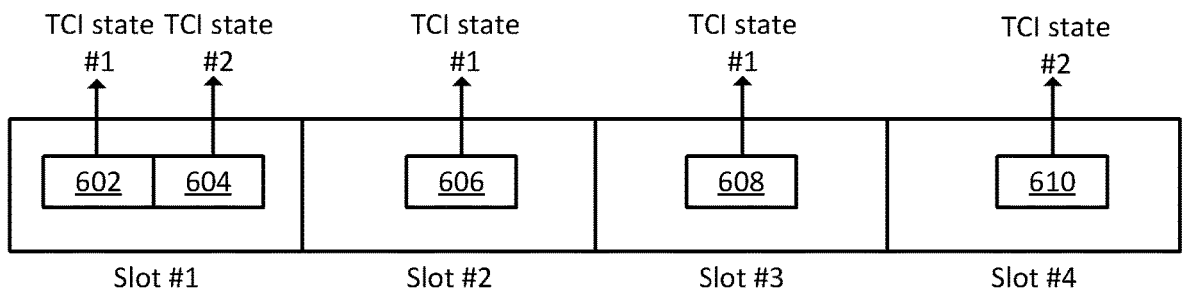
FIG. 6 is a diagram illustrating a plurality of repetitions mapped to TCI states based on different types of TCI state mapping orders, according to an example implementation of the present disclosure.

FIG. 6 is a diagram illustrating a plurality of repetitions mapped to TCI states based on different types of TCI state mapping orders, according to an example implementation of the present disclosure. In the present implementation, the TCI state mapping order for the slot-based repetition scheme is a sequential mapping type and the TCI state mapping order for the non-slot-based repetition scheme is a cyclic mapping type. As illustrated in FIG. 6, the non-slot-based repetition scheme is applied in slot #1 and the slot-based repetition scheme is applied in slots #2, #3 and #4. In slot #1, the TCI state mapping pattern of the repetitions 602 and 604 is {TCI state #1, TCI state #2}. In slots #2, #3 and #4, the TCI state mapping order is switched to the sequential mapping type in which every certain number of sequential repetitions may apply the same TCI state. For example, the TCI state mapping order may follow the sequential set of TCI states: {TCI state #1, TCI state #1, TCI state #2, TCI state #2} if the certain number of sequential repetitions that should apply the same TCI state is "2." In such a case, the repetitions 606, 608, and 610 for the slot-based repetition scheme may map to the first three TCI states of the sequential set. That is, the repetitions 606, 608, and 610 may map to TCI state #1, TCI state #1, and TCI state #2, respectively, as illustrated in FIG. 6. In some other implementations, the slot-based repetition scheme and the non-slot-based repetition scheme may have the same TCI state mapping order (e.g., with a sequential mapping type or a cyclic mapping type).

In some implementations, different types of TCI state mapping orders may be configured for a UE by RRC signaling. The network may then indicate to the UE which type of TCI state mapping order should be applied by transmitting DCI or MAC-CE signaling.

In some implementations, the parameter of the TCI state mapping order may be an index that can be set to one of several possible values each corresponding to a certain type of TCI state mapping order. For example, the index may be set to "index 0" for a cyclical mapping type, to "index 1" for a sequential mapping type, and to "index 2" for a predefined mapping type. Once the parameter is configured, the value of such an index to be applied may be indicated by the network through DCI and/or MAC-CE signaling.

In some implementations, the predefined mapping type described above may refer to a TCI state mapping order other than the sequential mapping type and the cyclical mapping type. Such a TCI state mapping order may have a regular or irregular order. For example, the TCI state mapping order may follow a predefined sequential set of TCI states such as {TCI state #1, TCI state #2, TCI state #2, TCI state #1}.

In some implementations, if the parameters for different repetition schemes (e.g., the parameters #1 and #2 described above) are configured, a dynamic indication (e.g., carried by DCI or MAC-CE signaling) may be used to indicate which mapping order (e.g., mapping order for slot-based scheme or mapping order for non-slot-based scheme) the UE applies to a scheduling of a repetition-based transmission (e.g., PUSCH repetition(s)). In some implementations, the scheduling may refer to the scheduling for the repetition operation.

Figure 7:
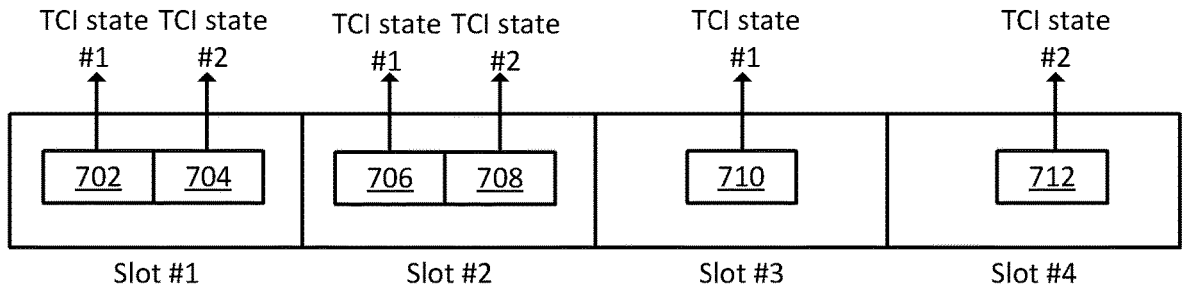
FIG. 7 is a diagram illustrating a plurality of repetitions mapped to TCI states based on a TCI state mapping order regardless of repetition schemes, according to an example implementation of the present disclosure.

FIG. 7 is a diagram illustrating a plurality of repetitions mapped to TCI states based on a TCI state mapping order regardless of repetition schemes, according to an example implementation of the present disclosure. As illustrated in FIG. 7, even though slots #1 and #2 apply the non-slot-based repetition scheme and slots #3 and #4 apply the slot-based repetition scheme, the repetitions 702, 704, 706, 708, 710, and 712 in these slots apply the same TCI state mapping order (e.g., with a cyclic TCI state mapping pattern of {TCI state #1, TCI state #2}), regardless of which repetition scheme is applied in a slot. In other words, the indicated TCI state mapping order may be applied to the scheduling of the repetition operation. The UE may not apply different TCI states mapping patterns to different repetition schemes, even though the scheduling may include different repetition schemes (e.g., non-slot-based repetition scheme and slot-based repetition scheme).

In some implementations, the UE may perform multi-TRP-based PUSCH repetition based on a given indicator corresponding to Type-A PUSCH repetition (or slot-based repetition scheme) and Type-B PUSCH repetition (or non-slot-based repetition scheme).

In some implementations, the TCI state mapping order may be configured/indicated/activated per a nominal repetition basis. In other words, each nominal repetition may map to a TCI state.

Figure 8:
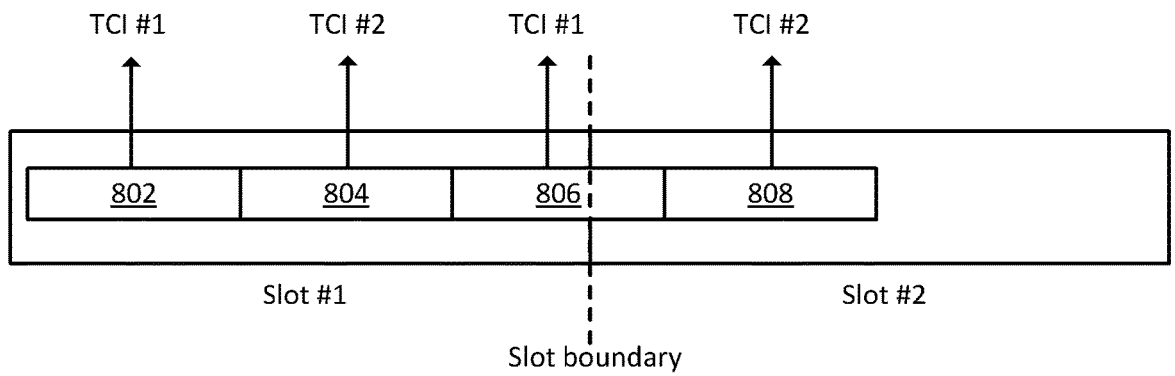
FIG. 8 is a diagram illustrating a plurality of nominal repetitions each mapping to a TCI state, according to an example implementation of the present disclosure.

FIG. 8 is a diagram illustrating a plurality of nominal repetitions each mapping to a TCI state, according to an example implementation of the present disclosure. As illustrated in FIG. 8, nominal repetitions 802, 804, 806, and 808 are mapped to TCI state #1, TCI state #2, TCI state #1, and TCI state #2, respectively. In other words, the type of the TCI state mapping order of the nominal repetitions 802, 804, 806, and 808 is a cyclic mapping type in the present implementation, with a cyclic TCI state mapping pattern of {TCI state #1, TCI state #2}.

Moreover, since the TCI state is configured per a nominal repetition basis, even if a nominal repetition that crosses a slot boundary or an invalid symbol(s) is split into more than one actual repetition, all actual repetition of the nominal repetition may map to the same TCI state. As illustrated in FIG. 8, the nominal repetition 806 maps to only one TCI state #1, even though it crosses a slot boundary and would be considered having two actual repetitions from the UE's perspective.

It should be noted that the implementation in FIG. 8 is for illustrative purposes only. In some other implementations, the type of TCI state mapping order may also be a sequential mapping type or any other predefined mapping type.

In some implementations, the TCI state mapping order may be configured by RRC (e.g., through an RRC parameter or an item in a TDRA list/table). In some implementations, the TCI state mapping order may be indicated by DCI (e.g., a new DCI field or an existing field that indicates a new entry/item configured by RRC). In some implementations, the TCI state mapping order may be activated by a MAC-CE. For example, the MAC-CE may activate a certain TCI state mapping order through a field or bitmap.

In some implementations, the TCI state mapping order may be configured/indicated/activated per an actual repetition basis. In other words, each actual repetition may map to a TCI state.

Figure 9:
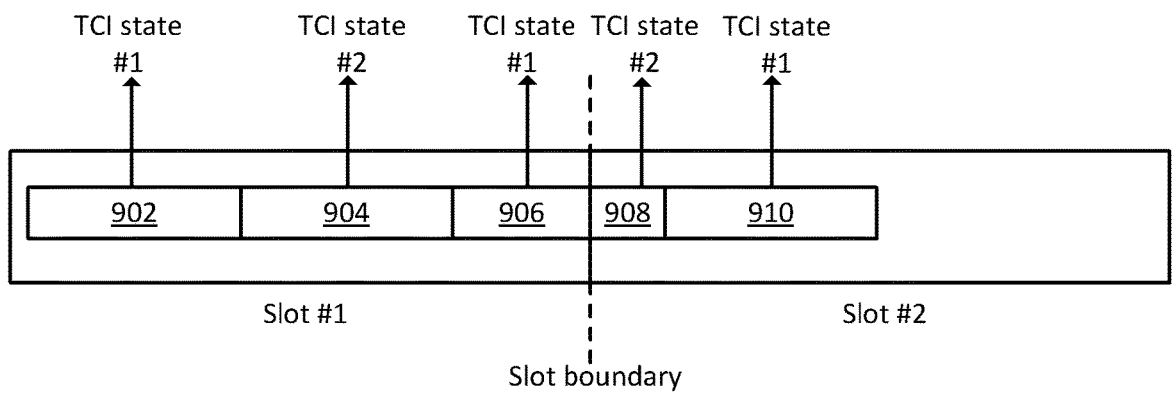
FIG. 9 is a diagram illustrating a plurality of actual repetitions each mapping to a TCI state, according to an example implementation of the present disclosure.

FIG. 9 is a diagram illustrating a plurality of actual repetitions each mapping to a TCI state, according to an example implementation of the present disclosure. As illustrated in FIG. 9, actual repetitions 902, 904, 906, 908, and 910 are mapped to TCI state #1, TCI state #2, TCI state #1, TCI state #2, and TCI state #1, respectively, where the actual repetitions 906 and 908 are split from the same nominal repetition since that nominal repetition crosses the slot boundary between slots #1 and #2.

The type of TCI mapping order may be arbitrary, such as the sequential mapping type, the cycling mapping type, or any other predefined mapping type(s). For example, in some other implementations, the TCI mapping order of the actual repetitions 902, 904, 906, 908, and 910 may follow the sequential set of TCI states: {TCI state #1, TCI state #1, TCI state #2, TCI state #2, TCI state #1}. In other words, actual repetitions 902, 904, 906, 908, and 910 may map to TCI state #1, TCI state #1, TCI state #2, TCI state #2, and TCI state #1, respectively. In some other implementations, the TCI mapping order of the actual repetitions 902, 904, 906, 908, and 910 may follow the sequential set of TCI states: {TCI state #1, TCI state #1, TCI state #1, TCI state #2, TCI state #2}. In some examples, the predefined mapping type may refer to a half-half mapping order, a slot-basis mapping order, or/and a sub-slot basis mapping order. In one example, half-half mapping order may apply a first TCI state to the first half number of repetitions and a second TCI state to the second half number of repetitions. In one example, a slot-basis mapping order may apply a first TCI state to a first slot (e.g., the start of repetition), a second TCI state to a second slot, and so on. In one example, a sub-slot basis mapping order may apply a first TCI state to a first sub-slot (e.g., the start of repetition), a second TCI state to a second sub-slot, and so on.

In some implementations, the TCI state mapping order may be configured by RRC (e.g., through an RRC parameter or an item in a TDRA list/table). In some implementations, the TCI state mapping order may be indicated by DCI (e.g., a new DCI field or an existing field that indicates a new entry/item configured by RRC). In some implementations, the TCI state mapping order may be activated by a MAC-CE. For example, the MAC-CE may activate a certain TCI state mapping order through a field or bitmap.

In some implementations, even though the TCI state mapping order is configured/indicated/activated per a nominal repetition basis first, it may then be changed per an actual repetition basis. In such a case, whether to map to a nominal repetition as a basis or to map to an actual repetition as a basis can be dynamically configured/switched.

Figure 10:
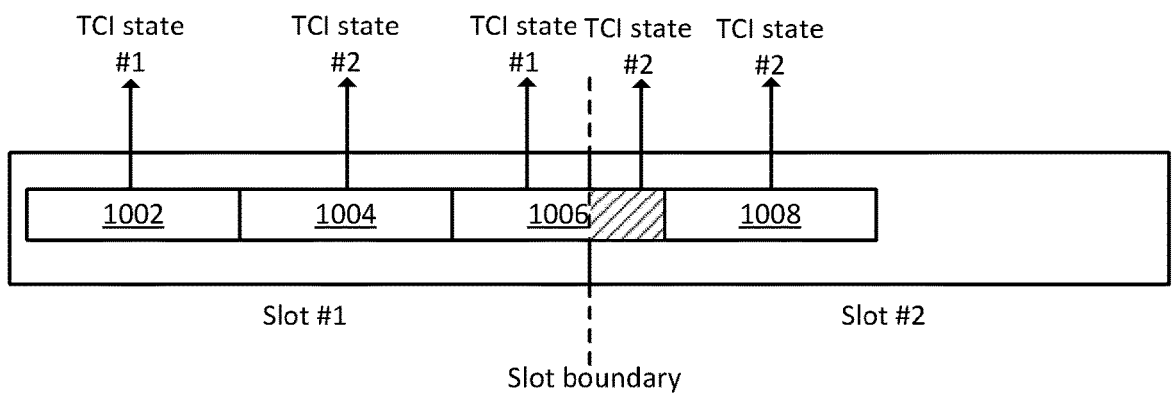
FIG. 10 is a diagram illustrating a process of changing the mapping basis of TCI states from a nominal repetition basis to an actual repetition basis, according to an example implementation of the present disclosure.

FIG. 10 is a diagram illustrating a process of changing the mapping basis of TCI states from a nominal repetition basis to an actual repetition basis, according to an example implementation of the present disclosure. As illustrated in FIG. 10, the nominal repetitions 1002, 1004, 1006, and 1008 map to TCI state #1, TCI state #2, TCI state #1, and TCI state #2, respectively. Since the nominal repetition 1006 is split into two actual repetitions by the slot boundary and the network changes the TCI state mapping order based on an actual repetition basis (e.g., through a specific indication), part of the nominal repetition 1006 (e.g., one of the actual repetitions split from the nominal repetition 1006, which is shaded by diagonal lines in FIG. 10) may be mapped to another TCI state (e.g., TCI state #2).

In some implementations, the specific indication may be carried by DCI or/and MAC-CE signaling. In some implementations, the specific indication may be used for switching the TCI mapping order between 'semi-static' and 'dynamic.' For example, if the RRC configures the sequential mapping type, and a bit value of the specific indication (e.g., "0" refers to not changing the configured mapping type, and "1" refers to changing to use the cyclical mapping type or a predefined mapping type) may be used to switch the TCI state mapping order for the scheduling. In some implementations, the specific indication may be used to indicate a specific TCI state that the UE should apply when the segmentation of a nominal repetition (e.g., a nominal repetition is split into more than one actual repetition) occurs. In some implementations, a UE may report a UE capability message to inform the network of whether the UE supports switching the TCI state mapping order.

In some implementations, the TCI state mapping order for repetitions may be a combination of a sequential mapping type and a cyclical mapping type, if the number of transmission occasions for repetitions is large enough (e.g., larger than a configured value). In some implementations, if the number of transmission occasions for repetitions is larger than a configured value, a UE may apply the cyclical mapping type to X repetition(s) and apply the sequential mapping type to Y repetition(s), where X and Y are natural numbers. For example, if the number of repetitions is "8" (e.g., the number of transmission occasions for repetitions is "8") and "X=Y=4," four sequential repetitions may be configured with the cyclical mapping type (e.g., by mapping to the sequential set of TCI states: {TCI state #1, TCI state #2, TCI state #1, TCI state #2}), and the other four sequential repetitions may be configured with the sequential mapping type (e.g., by mapping to the sequential set of TCI states: {TCI state #1, TCI state #1, TCI state #2, TCI state #2}).

Figure 11:
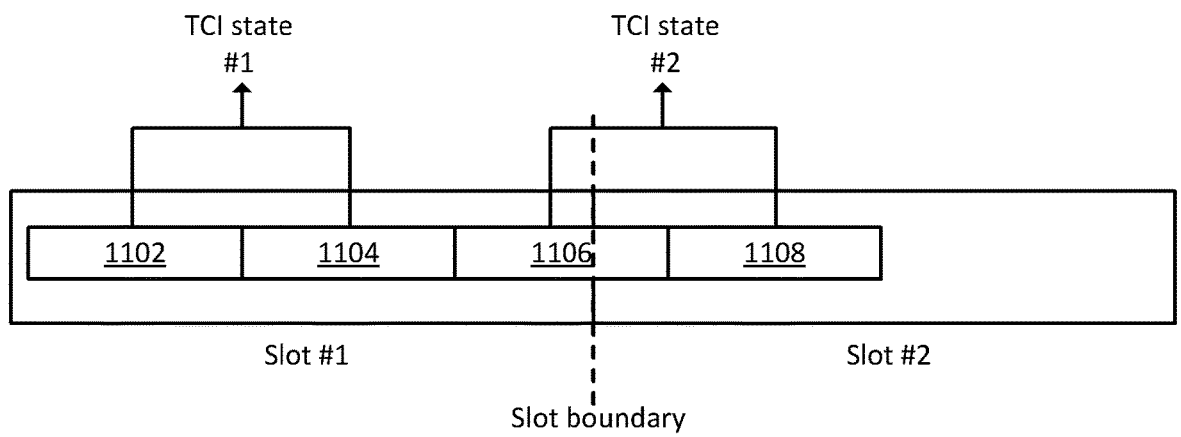
FIG. 11 is a diagram illustrating a TCI mapping order of multiple consecutive repetitions, according to an example implementation of the present disclosure.

FIG. 11 is a diagram illustrating a TCI mapping order of multiple consecutive repetitions, according to an example implementation of the present disclosure. As illustrated in FIG. 11, two or more consecutive (nominal) repetitions under the non-slot-based repetition scheme may map to one TCI state. For example, the consecutive repetitions 1102 and 1104 are mapped to TCI state #1, and the consecutive repetitions 1106 and 1108 are mapped to TCI state #2.

In some implementations, the number of consecutive repetitions mapped to one TCI state may be configured/indicated by RRC, DCI, or/and MAC-CE signaling. In some implementations, the number of consecutive repetitions may be configured by the parameter RepNumTypeB. In some implementations, the number of consecutive repetitions may be configured by the parameter RepNumTypeB if the parameter that indicates the TCI state mapping order for the non-slot-based repetition scheme is not configured. In some implementations, the number of consecutive repetitions may be indicated by a repetition number parameter that is included in a row/item/entry of a TDRA list. The network may indicate to a UE a certain number of consecutive repetitions by indicating the row/item/entry of the TDRA list in the scheduling DCI. In some implementations, the number of consecutive repetitions may be dynamically changed by the network. In some implementations, whether the number of consecutive repetitions can be an arbitrary number may be reported to the network through a UE capability message from the UE. In some implementations, the number of consecutive repetitions may refer to the number of the transmission occasions of nominal repetitions or actual repetitions. More specifically, the UE may determine to apply the same TCI states to the specific number of consecutive nominal repetitions or actual repetitions. In some implementations, the number of consecutive repetitions may be the number of nominal repetitions or actual repetitions within a slot.

Figure 12:
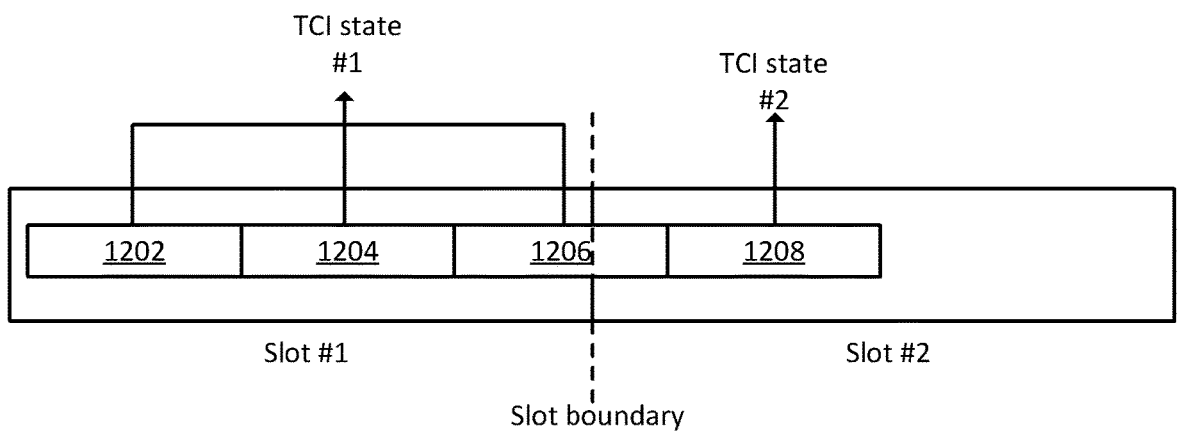
FIG. 12 is a diagram illustrating a TCI mapping order of multiple consecutive repetitions, according to another example implementation of the present disclosure.

FIG. 12 is a diagram illustrating a TCI mapping order of multiple consecutive repetitions, according to another example implementation of the present disclosure. As illustrated in FIG. 12, the number of repetitions corresponding to one TCI state may be variable. For example, there may be X (e.g., "X=3" in FIG. 12) repetition(s) (e.g., repetitions 1202, 1204, and 1206) mapped a first TCI state (e.g., TCI state #1) and Y (e.g., "Y=1" in FIG. 12) repetition(s) (e.g., repetition 1208) mapped a second TCI state (e.g., TCI state #2). The parameters X and Y may be configured, predefined, or indicated by the network.

In some implementations, a non-uniform TCI state mapping order for repetitions may be dynamically scheduled by the network. The non-uniform TCI state mapping order may refer to a TCI state mapping order in that the repetitions mapped to the same TCI state are not equally distributed between neighboring repetitions. In other words, the number of repetitions corresponding to a specific TCI state may vary. In some implementations, the UE may transmit a UE capability message to inform the network of the supported values (or value ranges) of the parameter X and/or Y. In some implementations, the non-uniform mapping may be performed when certain condition(s) is met. The condition(s) may be associated with the number of Control Resource Sets (CORESETs), the configuration of the multi-TRP scheme, the channel quality (e.g., Channel State Information (CSI) report), and/or UE implementation.

Time-Domain Offset Distribution Among Multiple Repetitions

In some aspect of the present disclosure, there may be a time-domain offset between two neighboring repetitions (nominal repetitions or actual repetitions). The value of the time-domain offset may be fixed or varied, depending on the network's configuration. For example, the time-domain offset may be configured/indicated/activated by RRC, DCI, or MAC-CE signaling.

Figure 13:
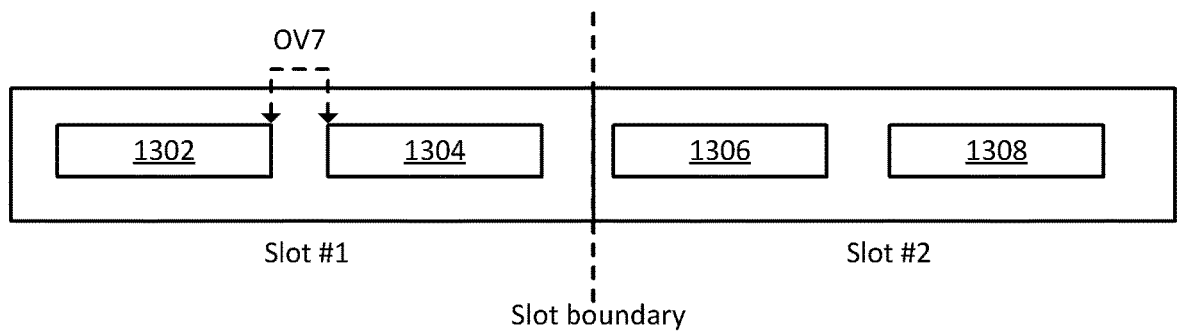
FIG. 13 is a diagram illustrating a pattern of time-domain offset distribution among multiple repetitions, according to an example implementation of the present disclosure.

FIG. 13 is a diagram illustrating a pattern of time-domain offset distribution among multiple repetitions, according to an example implementation of the present disclosure. As illustrated in FIG. 13, there is a time-domain offset (e.g., OV7) between each two neighboring repetitions (e.g., between repetitions 1302 and 1304, between repetitions 1304 and 1306, and between repetitions 1306 and 1308).

It should be noted that the term "offset (value)" and the term "time-domain offset (value)" may be interchangeably utilized in the present disclosure, unless otherwise stated.

In some other implementations, more than one offset value may be configured. In other words, the offsets between every two neighboring repetitions can be configured individually and may not have the same value. The offset(s) may be configured/indicated/activated by RRC, DCI, or MAC-CE signaling.

In some other implementations, the offset may be determined by the number of omitted transmission occasions for nominal repetitions. In some other implementations, the offset may be determined by the number of omitted transmission occasions for actual repetitions. In some implementations, the offset may be determined by omitting an actual repetition in an earlier slot of a nominal repetition crossing a slot boundary. In some other implementations, the offset may be determined by omitting an actual repetition in a later slot of a nominal repetition crossing a slot boundary. Taking FIG. 9 as an example, the actual repetition 906 is the actual repetition in the earlier slot (e.g., slot #1) of the nominal repetition crossing the slot boundary, and the actual repetition 908 is the actual repetition in the later slot (e.g., slot #2) of the nominal repetition crossing the slot boundary.

In some implementations, the UE may perform operations shown in Table 1.

TABLE 1

An offset duration is configured or indicated to the UE, and after receiving a configured or indicated number of consecutive nominal repetition or actual repetition transmission occasions with a corresponding TCI state, beam, or panel, if the offset duration is smaller than the duration between the end of the last actual repetition transmission occasion before switching the TCI state and the start of the first actual repetition transmission occasion after switching the TCI state, UE does not omit any actual repetition transmission occasion, else if the offset duration is smaller than the duration between the end of the last actual repetition transmission occasion before switching the TCI state and the start of the X-th (X ≠ 1) actual repetition transmission occasion after switching the TCI state, UE omits the first, second, . . . , (X-1)-th actual repetition transmission occasions after the end of the last actual repetition transmission occasion before switching the TCI state.

Figure 14:
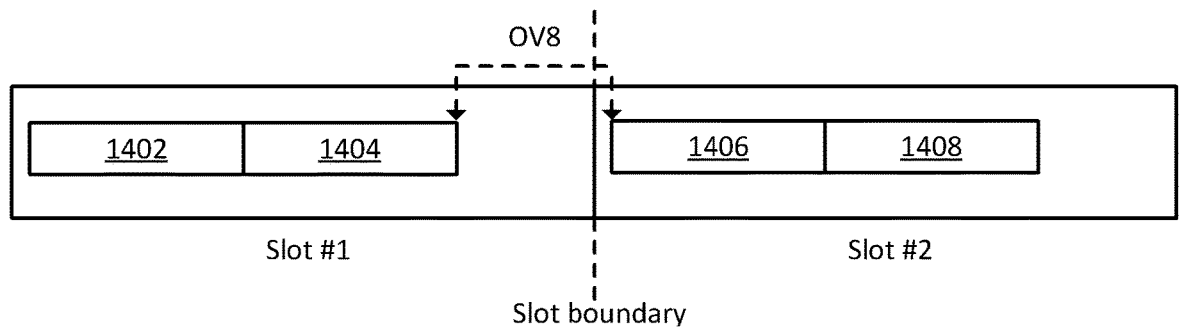
FIG. 14 is a diagram illustrating a pattern of time-domain offset distribution among multiple repetitions, according to an example implementation of the present disclosure.

FIG. 14 is a diagram illustrating a pattern of time-domain offset distribution among multiple repetitions, according to an example implementation of the present disclosure. As illustrated in FIG. 14, a non-zero offset value (e.g., OV8) is between repetitions 1404 and 1406, and a zero offset value (e.g., the offset value is "0") is between repetitions 1402 and 1404 and between repetitions 1406 and 1408. In other words, the repetitions 1402 and 1404 are two consecutive repetitions, and the repetitions 1406 and 1408 are also consecutive repetitions.

In some implementations, the offset(s) may be dynamically scheduled by the network. In some implementations, the network may transmit to the UE an indication whether the scheduling of the transmission occasions for repetitions is with any offset. The scheduling may refer to a repetition transmission scheduled by DCI, and the DCI may include the offset indication.

In some implementations, the supported offset(s) value may be reported by UE capability. In some implementations, whether to apply an offset may be dynamically indicated by the network. In some implementations, once an offset is configured, the network may use DCI or MAC-CE signaling to activate or deactivate the use of the offset. Once the offset is activated, the UE may apply the offset. Once the offset is deactivated, the UE may not apply the offset even if the offset has been configured.

In some implementations, whether to apply the offset may be reported through a UE capability message from the UE. In some implementations, the time unit of an offset (value) between two repetitions may be symbols, sub-slots, or slots. In some implementations, the offset may be applied when certain condition(s) is met. For example, the condition may be determined based on whether a repetition crosses an invalid symbol(s) or a slot boundary. For example, the condition may be determined based on whether the number of configured CORESETs is larger than or equal to a threshold. For example, the condition may be indicated from a configuration for a multi-TRP scheme. For example, the condition may be determined based on whether the channel quality (e.g., CSI report) meets a predetermined level.

In some implementations, the offset may be applied between two neighboring repetitions mapping to different TCI states. In some other implementations, the offset may be applied between two neighboring repetitions mapping to the same TCI state.

In some implementations, the offset may not be applied between two neighboring repetitions mapping to the TCI states that are not configured with 'QCL-TypeD'. In other words, if the repetitions are not configured with QCL-TypeD, the duration between two transmission occasions of neighboring repetitions may be determined based on the configured repetition scheme (e.g., Type-A repetition or Type-B repetition) instead of the indicated offset. In some implementations, the offset may not be applied between two neighboring repetitions mapping to the TCI states/UL beam information that are associated with the same sounding reference signal (SRS) resource set. In other words, if the repetitions are associated with the same SRS resource set, the duration between two neighboring transmission occasions of the repetitions may be determined based on the configured repetition scheme (e.g., Type-A repetition or Type-B repetition) instead of the indicated offset.

In some implementations, the UE may be configured with multiple offsets including a first offset and a second offset. The first offset may be applied between two neighboring transmission occasions of repetitions mapping to the TCI states/UL beam information associated with the same SRS resource set, and the second offset may be applied between two neighboring transmission occasions of repetitions mapping to the TCI states/UL beam information associated with different SRS resource sets. In some other implementations, the first offset may be applied between two neighboring transmission occasions of repetitions mapping to the TCI states/UL beam information associated with the same UE antenna panel, and the second offset may be applied between two neighboring transmission occasions of repetitions mapping to the TCI states/UL beam information associated with different UE antenna panels. The information related to the UE panel (or "UE panel information") may be derived from BS signaling. In some implementations, the UE panel information may be derived from the TCI state/UL beam indication information. In some other implementations, the UE panel information for a TCI state/UL beam may be explicitly indicated by BS signaling. The first offset may be smaller or be equal to the second offset. In some implementations, the first offset value may be zero.

Actual PUSCH Repetition for Repetition Type B

As described previously, a nominal repetition may be split into more than one actual repetition when crossing a slot boundary or an invalid symbol(s). In some implementations, the symbol(s) used as the offset(s) described previously may be considered as invalid symbol(s). In such a case, two neighboring transmission occasions of repetitions separated by the offset are actual repetitions. In some implementations, the invalid symbol is a DL symbol if the nominal repetition split by the invalid symbol is a PUSCH repetition. The invalid symbol(s) may be located right before the first symbol of a nominal repetition and/or immediately after the last symbol of the nominal repetition.

In some implementations, the repetitions which have not been finished may be dropped if the given offset is larger than or equal to a predetermined value.

Figure 15:
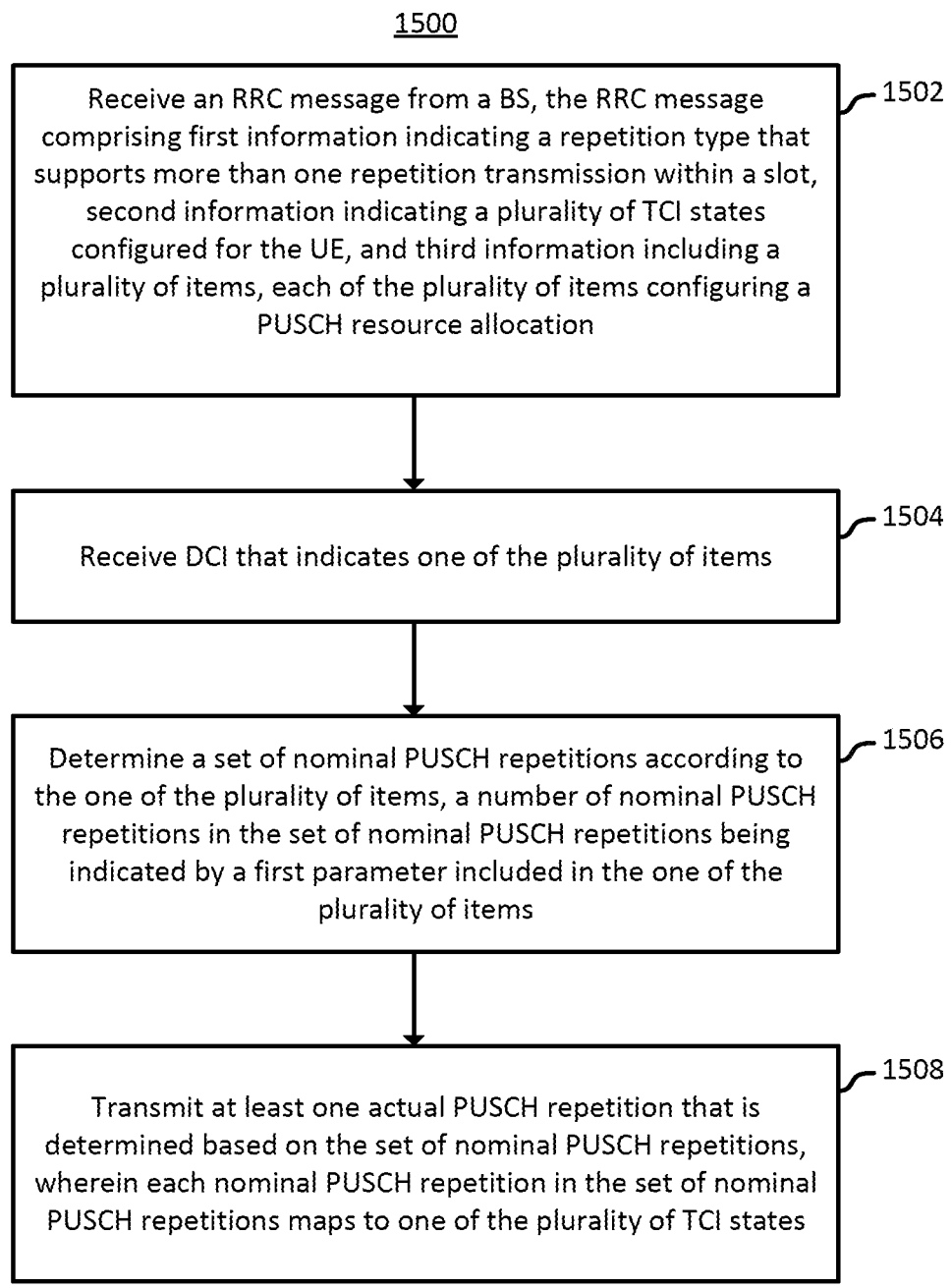
FIG. 15 is a flowchart illustrating a wireless communication method performed by a UE for performing repetition-based UL transmissions, according to an implementation of the present disclosure.

FIG. 15 is a flowchart illustrating a wireless communication method 1500 performed by a UE for performing repetition-based UL transmissions, according to an implementation of the present disclosure. Although actions 1502, 1504, 1506 and 1508 are illustrated as separate actions represented as independent blocks in FIG. 15, these separately illustrated actions should not be construed as necessarily order dependent. The order in which the actions are performed in FIG. 15 is not intended to be construed as a limitation, and any number of the disclosed blocks may be combined in any order to implement the method, or an alternate method. Moreover, each of actions 1502, 1504, 1506 and 1508 may be performed independent of other actions and can be omitted in some implementations of the present disclosure.

In action 1502, the UE may receive an RRC message from a BS. The RRC message may comprise first information, second information, and third information. The first information may indicate a repetition type that supports more than one repetition transmission within a slot. For example, the repetition type may be the slot-based repetition scheme (or "repetition type A") described above. For example, the repetition type may be the non-slot-based repetition scheme or "repetition type B" described above. The second information may indicate a plurality of TCI states configured for the UE. The third information may include a plurality of items, each of the plurality of items configuring a PUSCH resource allocation. In some implementations, the third information may be represented as (or correspond to) a TDRA list. An item of a TDRA list may refer to a row or an entry of the TDRA list. Each item of the TDRA list may include one or more parameters for configuring a PUSCH resource allocation. For example, an item of the TDRA list may include at least one of an item index that identifies the item of the TDRA list, a slot offset(s) (K1 and/or K2) that defines the time-domain location of a PUSCH transmission occasion, a starting symbol(S) of the PUSCH transmission occasion, an allocation length (L) of the PUSCH transmission occasion, and a certain number of PUSCH repetitions (e.g., RepNum or RepNumTypeB).

In action 1504, the UE may receive DCI that indicates one of the plurality of items. For example, the DCI may include an item/row/entry index of the TDRA list represented by the third information.

In action 1506, the UE may determine a set of nominal PUSCH repetitions according to the one of the plurality of items, where the number of nominal PUSCH repetitions in the set of nominal PUSCH repetitions may be indicated by a first parameter included in the one of the plurality of items.

In some implementations, the first parameter may be the parameter RepNum or RepNumTypeB described previously that is used to indicate the number of nominal PUSCH repetitions. For example, if RepNumTypeB=2, the number of nominal PUSCH repetitions is "2." In such a case, the set of nominal PUSCH repetitions includes two PUSCH repetitions, where the PUSCH resource allocation for each of the PUSCH repetitions may be determined by the parameters in the indicated item of the TDRA list (e.g., the parameters K1, K2, S, and/or L). In some implementations, the one of the plurality of items indicated by the DCI may further include a second parameter that indicates a (TCI state) mapping type between the set of nominal PUSCH repetitions and the plurality of TCI states. The (TCI state) mapping type may be a cyclic mapping type or a sequential mapping type.

In action 1508, the UE may transmit at least one actual PUSCH repetition that is determined based on the set of nominal PUSCH repetitions. Each nominal PUSCH repetition in the set of nominal PUSCH repetitions may map to one of the plurality of TCI states.

As described previously, the UE may determine the at least one actual PUSCH repetition by splitting the set of nominal PUSCH repetitions across at least one slot boundary or across at least one symbol considered invalid for UL transmission. For example, the at least one actual PUSCH repetition may include a first actual PUSCH repetition and a second actual PUSCH repetition. The first actual PUSCH repetition and the second actual PUSCH repetition may be split from the same nominal PUSCH repetition in the set of nominal PUSCH repetitions. In some implementations, the first actual PUSCH repetition and the second actual PUSCH repetition may map to the same TCI state.

In some implementations, the UE may be configured with fourth information that indicates a time-domain offset between two neighboring nominal PUSCH repetitions in the set of nominal PUSCH repetitions. In some implementations, the time-domain offset may be configured by the BS per a nominal PUSCH repetition basis. In some implementations, each two neighboring nominal PUSCH repetitions in the set of nominal PUSCH repetitions may have the same time-domain offset.

The method 1500 may be advantageous to a UE to transmit data more reliably by enabling the UE to perform one or more PUSCH repetitions, where each PUSCH repetition corresponds to a specific beam (e.g., a TCI state). The mapping between the PUSCH repetition(s) and the beam(s) may be implemented based on a configuration received from the network. Therefore, the method 1500 is more flexible and better fits the requirements of different 5G scenarios (e.g., multi-TRP scenarios).

The following may be used to further disclose terms, examples, embodiments, implementations, actions, and/or behaviors:

Antenna Panel: A conceptual term for UE antenna implementation. It may be assumed that a panel is an operational unit for controlling a transmit spatial filter (beam). A panel typically includes a plurality of antenna elements. In some implementations, a beam can be formed by a panel, and in order to form two beams simultaneously, two panels are needed. Such simultaneous beamforming from multiple panels is subject to UE capability. A similar definition for "panel" may be possible by applying spatial receiving filtering characteristics.

HARQ (Hybrid Automatic Repeat reQuest): A functionality ensures delivery between peer entities at Layer 1 (e.g., Physical Layer). A single HARQ process supports one Transport Block (TB) when the physical layer is not configured for downlink/uplink spatial multiplexing, and when the physical layer is configured for downlink/uplink spatial multiplexing, a single HARQ process supports one or multiple TBs. There is one HARQ entity per serving cell. Each HARQ entity supports a parallel (number) of DL and UL HARQ process.

Timer: A MAC entity can set up one or more timers for individual purposes, for example, triggering some uplink signaling retransmission or limiting some uplink signaling retransmission period. A timer is running once it is started, until it is stopped or until it expires; otherwise, it is not running. A timer can be started if it is not running or restarted if it is running. A timer is always started or restarted from its initial value. The initial value can be, but is not limited to be, configured by the gNB via downlink RRC signaling.

BWP (Bandwidth Part): A subset of the total cell bandwidth of a cell is referred to as a BWP, and beamwidth part adaptation is achieved by configuring the UE with BWP(s) and telling the UE which of the configured BWPs is currently the active one. To enable Bandwidth Adaptation (BA) on the PCell, the gNB configures the UE with UL and DL BWP(s). To enable BA on SCells in case of CA, the gNB configures the UE with DL BWP(s) at least (e.g., there may be none in the UL). For the PCell, the initial BWP is the BWP used for initial access. For the SCell(s), the initial BWP is the BWP configured for the UE to first operate at SCell activation. The UE may be configured with a first active uplink BWP by a firstActiveUplinkBWP IE. If the first active uplink BWP is configured for an SpCell, the firstActiveUplinkBWP IE field contains the ID of the UL BWP to be activated upon performing the RRC (re-)configuration. If the field is absent, the RRC (re-)configuration does not impose a BWP switch. If the first active uplink BWP is configured for an SCell, the firstActiveUplinkBWP IE field contains the ID of the uplink bandwidth part to be used upon MAC-activation of an SCell.

QCL (Quasi Co-Location): Two antenna ports are said to be quasi co-located if properties of the channel over which a symbol on one antenna port is conveyed can be inferred from the channel over which a symbol on the other antenna port is conveyed. The "properties of the channel" above may include Doppler shift, Doppler spread, average delay, delay spread, and spatial RX parameters. These properties are categorized into different QCL types in NR specifications. For example, QCL-TypeD refers to a spatial RX parameter. QCL-TypeD is also referred to as "beam" in this document.

TCI state: A TCI state contains parameters for configuring a QCL relationship between one or two reference signals and a target reference signal set. For example, a target reference signal set may be the DM-RS ports of PDSCH, PDCCH, Physical Uplink Control Channel (PUCCH), or PUSCH. The one or two reference signals maybe UL or DL reference signals. In NR Rel-15/16, TCI state is used for DL QCL indication, whereas spatial relation information is used for providing UL spatial transmission filter information for UL signal(s) or UL channel(s). Here, a TCI state may refer to information provided that is similar to spatial relation information, which could be used for UL transmission. In other words, from the UL perspective, a TCI state provides UL beam information which may provide the information for a relationship between a UL transmission and DL or UL reference signals (e.g., CSI-RS, Synchronization Signal Block (SSB), SRS, Phase Tracking Reference Signal (PTRS)).

Panel: UE panel information may be derived from TCI state/UL beam indication information or network signaling.

Beam: The term "beam" here may be replaced by "spatial filter." For example, when UE reports a preferred gNB TX beam, the UE is essentially selecting a spatial filter used by gNB. The term "beam information" is used to provide information about which beam/spatial filter is being used/selected.

Figure 16:
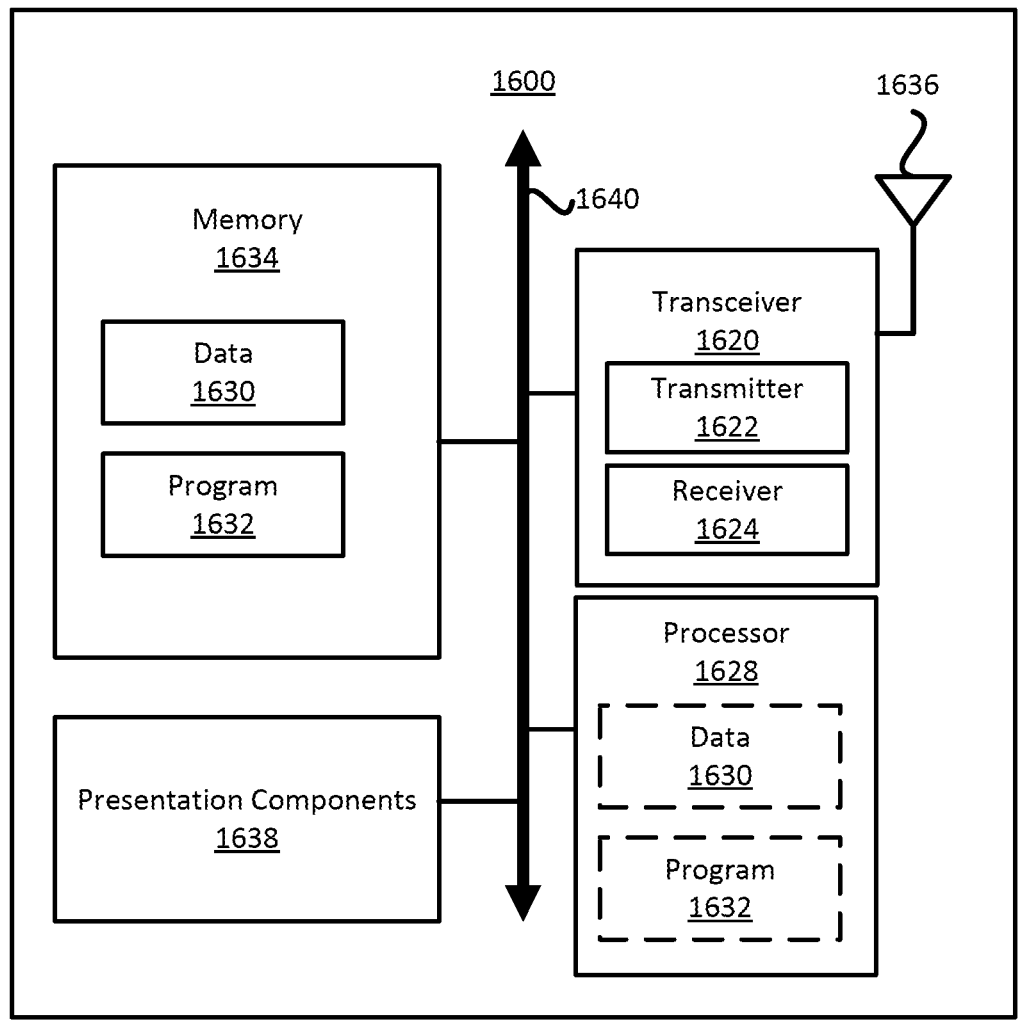
FIG. 16 is a block diagram illustrating a node for wireless communication according to an implementation of the present disclosure.

FIG. 16 is a block diagram illustrating a node 1600 for wireless communication according to an implementation of the present disclosure. As illustrated in FIG. 16, a node 1600 may include a transceiver 1620, a processor 1628, a memory 1634, one or more presentation components 1638, and at least one antenna 1636. The node 1600 may also include a radio frequency (RF) spectrum band module, a BS communications module, a network communications module, and a system communications management module, Input/Output (I/O) ports, I/O components, and a power supply (not illustrated in FIG. 16).

Each of the components may directly or indirectly communicate with each other over one or more buses 1640. The node 1600 may be a UE or a BS that performs various functions disclosed with reference to FIGS. 1 through 15.

The transceiver 1620 has a transmitter 1622 (e.g., transmitting/transmission circuitry) and a receiver 1624 (e.g., receiving/reception circuitry) and may be configured to transmit and/or receive time and/or frequency resource partitioning information. The transceiver 1620 may be configured to transmit in different types of subframes and slots, including but not limited to usable, non-usable, and flexibly usable subframes and slot formats. The transceiver 1620 may be configured to receive data and control channels.

The node 1600 may include a variety of computer-readable media. Computer-readable media may be any available media that may be accessed by the node 1600 and include volatile (and/or non-volatile) media and removable (and/or non-removable) media.

The computer-readable media may include computer-storage media and communication media. Computer-storage media may include both volatile (and/or non-volatile media) and removable (and/or non-removable) media implemented in any method or technology for storage of information, such as computer-readable instructions, data structures, program modules or data.

Computer-storage media may include RAM, ROM, EPROM, EEPROM, flash memory (or other memory technology), CD-ROM, Digital Versatile Disks (DVD) (or other optical disk storage), magnetic cassettes, magnetic tape, magnetic disk storage (or other magnetic storage devices), etc. Computer-storage media may not include a propagated data signal. Communication media may typically embody computer-readable instructions, data structures, program modules, or other data in a modulated data signal, such as a carrier wave, or other transport mechanisms and include any information delivery media.

The term "modulated data signal" may mean a signal that has one or more of its characteristics set or changed in such a manner as to encode information in the signal. Communication media may include wired media, such as a wired network or direct-wired connection, and wireless media, such as acoustic, RF, infrared, and other wireless media. Combinations of any of the previously listed components should also be included within the scope of computer-readable media.

The memory 1634 may include computer-storage media in the form of volatile and/or non-volatile memory. The memory 1634 may be removable, non-removable, or a combination thereof. Example memory may include solid-state memory, hard drives, optical-disc drives, etc. As illustrated in FIG. 16, the memory 1634 may store a computer-readable and/or computer-executable program 1632 (e.g., software codes or a set of instructions) that are configured to, when executed, cause the processor 1628 to perform various functions disclosed herein, for example, with reference to FIGS. 1 through 15. Alternatively, the program 1632 may not be directly executable by the processor 1628 but may be configured to cause the node 1600 (e.g., when compiled and executed) to perform various functions disclosed herein.

The processor 1628 (e.g., having processing circuitry) may include an intelligent hardware device, e.g., a Central Processing Unit (CPU), a microcontroller, an ASIC, etc. The processor 1628 may include memory. The processor 1628 may process the data 1630 and the program 1632 received from the memory 1634, and information transmitted and received via the transceiver 1620, the baseband communications module, and/or the network communications module. The processor 1628 may also process information to send to the transceiver 1620 for transmission via the antenna 1636 to the network communications module for transmission to a CN.

One or more presentation components 1638 may present data indications to a person or another device. Examples of presentation components 1638 may include a display device, a speaker, a printing component, a vibrating component, etc.

In view of the present disclosure, it is obvious that various techniques may be used for implementing the disclosed concepts without departing from the scope of those concepts. Moreover, while the concepts have been disclosed with specific reference to certain implementations, a person of ordinary skill in the art may recognize that changes may be made in form and detail without departing from the scope of those concepts. As such, the disclosed implementations are considered in all respects as illustrative and not restrictive. It should also be understood that the present disclosure is not limited to the specific implementations disclosed. Still, many rearrangements, modifications, and substitutions are possible without departing from the scope of the present disclosure.

What is claimed is:

1. A wireless communication method performed by a User Equipment (UE) for performing repetition-based Uplink (UL) transmissions, the wireless communication method comprising:
receiving a Radio Resource Control (RRC) message from a Base Station (BS), the RRC message comprising
first information indicating a repetition type that supports more than one repetition transmission within a slot,
second information indicating a plurality of Transmission Configuration Indicator (TCI) states configured for the UE, and
third information including a plurality of items, each of the plurality of items configuring a Physical Uplink Shared Channel (PUSCH) resource allocation;
receiving Downlink Control Information (DCI) that indicates one of the plurality of items;
determining a set of nominal PUSCH repetitions according to the one of the plurality of items, a number of nominal PUSCH repetitions in the set of nominal PUSCH repetitions being indicated by a first parameter included in the one of the plurality of items; and
transmitting at least one actual PUSCH repetition that is determined based on the set of nominal PUSCH repetitions,
wherein each nominal PUSCH repetition in the set of nominal PUSCH repetitions maps to one of the plurality of TCI states.

2. The wireless communication method according to claim 1, wherein the one of the plurality of items further includes a second parameter that indicates a mapping type between the set of nominal PUSCH repetitions and the plurality of TCI states.

3. The wireless communication method according to claim 2, wherein the mapping type is a cyclic mapping type or a sequential mapping type.

4. The wireless communication method according to claim 1, further comprising:
determining the at least one actual PUSCH repetition by splitting the set of nominal PUSCH repetitions across at least one slot boundary or across at least one symbol that is considered invalid for Uplink (UL) transmission, wherein:
the at least one actual PUSCH repetition comprises a first actual PUSCH repetition and a second actual PUSCH repetition,
the first actual PUSCH repetition and the second actual PUSCH repetition are split from a same nominal PUSCH repetition in the set of nominal PUSCH repetitions, and
the first actual PUSCH repetition and the second actual PUSCH repetition map to a same TCI state of the plurality of TCI states.

5. The wireless communication method according to claim 1, wherein the third information corresponds to a Time Domain Resource Assignment (TDRA) list.

6. The wireless communication method according to claim 1, wherein the UE is further configured with fourth information that indicates a time-domain offset between two neighboring nominal PUSCH repetitions in the set of nominal PUSCH repetitions.

7. The wireless communication method according to claim 6, wherein the time-domain offset is configured by the BS per a nominal PUSCH repetition basis.

8. The wireless communication method according to claim 1, wherein each two neighboring nominal PUSCH repetitions in the set of nominal PUSCH repetitions have a same time-domain offset.

9. A User Equipment (UE) for performing repetition-based Uplink (UL) transmissions, the UE comprising:
at least one processor; and
at least one memory coupled to the at least one processor, the at least one memory storing computer-executable instructions that, when executed by the at least one processor, cause the UE to:
receive a Radio Resource Control (RRC) message from a Base Station (BS), the RRC message comprising
first information indicating a repetition type that supports more than one repetition transmission within a slot,
second information indicating a plurality of Transmission Configuration Indicator (TCI) states configured for the UE, and
third information including a plurality of items, each of the plurality of items configuring a Physical Uplink Shared Channel (PUSCH) resource allocation;
receive Downlink Control Information (DCI) that indicates one of the plurality of items;
determine a set of nominal PUSCH repetitions according to the one of the plurality of items, a number of nominal PUSCH repetitions in the set of nominal PUSCH repetitions being indicated by a first parameter included in the one of the plurality of items; and
transmit at least one actual PUSCH repetition that is determined based on the set of nominal PUSCH repetitions,
wherein each nominal PUSCH repetition in the set of nominal PUSCH repetitions maps to one of the plurality of TCI states.

10. The UE according to claim 9, wherein the one of the plurality of items further includes a second parameter that indicates a mapping type between the set of nominal PUSCH repetitions and the plurality of TCI states.

11. The UE according to claim 10, wherein the mapping type is a cyclic mapping type or a sequential mapping type.

12. The UE according to claim 9, wherein the computer-executable instructions further cause the UE to:
determine the at least one actual PUSCH repetition by splitting the set of nominal PUSCH repetitions across at least one slot boundary or across at least one symbol that is considered invalid for Uplink (UL) transmission, wherein:
the at least one actual PUSCH repetition comprises a first actual PUSCH repetition and a second actual PUSCH repetition,
the first actual PUSCH repetition and the second actual PUSCH repetition are split from a same nominal PUSCH repetition in the set of nominal PUSCH repetitions, and the first actual PUSCH repetition and the second actual PUSCH repetition map to a same TCI state of the plurality of TCI states.

13. The UE according to claim 9, wherein the third information corresponds to a Time Domain Resource Assignment (TDRA) list.

14. The UE according to claim 9, wherein the UE is further configured with fourth information that indicates a time-domain offset between two neighboring nominal PUSCH repetitions in the set of nominal PUSCH repetitions.

15. The UE according to claim 14, wherein the time-domain offset is configured by the BS per a nominal PUSCH repetition basis.

16. The UE according to claim 9, wherein each two neighboring nominal PUSCH repetitions in the set of nominal PUSCH repetitions have a same time-domain offset.

17. A Base Station (BS) for performing repetition-based Uplink (UL) transmissions, the BS comprising:
   at least one processor; and
   at least one memory coupled to the at least one processor, the at least one memory storing computer-executable instructions that, when executed by the at least one processor, cause the BS to:
      transmit a Radio Resource Control (RRC) message to a User Equipment (UE), the RRC message comprising
         first information indicating a repetition type that supports more than one repetition transmission within a slot,
         second information indicating a plurality of Transmission Configuration Indicator (TCI) states configured for the UE, and
         third information including a plurality of items, each of the plurality of items configuring a Physical Uplink Shared Channel (PUSCH) resource allocation;
      transmit Downlink Control Information (DCI) that indicates one of the plurality of items, wherein the UE determines a set of nominal PUSCH repetitions according to the one of the plurality of items, and a number of nominal PUSCH repetitions in the set of nominal PUSCH repetitions is indicated by a first parameter included in the one of the plurality of items; and
      receive, from the UE, at least one actual PUSCH repetition that is determined based on the set of nominal PUSCH repetitions,
      wherein each nominal PUSCH repetition in the set of nominal PUSCH repetitions maps to one of the plurality of TCI states.

18. The BS according to claim 17, wherein the one of the plurality of items further includes a second parameter that indicates a mapping type between the set of nominal PUSCH repetitions and the plurality of TCI states.

19. The BS according to claim 18, wherein the mapping type is a cyclic mapping type or a sequential mapping type.

20. The BS according to claim 17, wherein:
   the at least one actual PUSCH repetition comprises a first actual PUSCH repetition and a second actual PUSCH repetition,
   the first actual PUSCH repetition and the second actual PUSCH repetition are split from a same nominal PUSCH repetition in the set of nominal PUSCH repetitions, and
   the first actual PUSCH repetition and the second actual PUSCH repetition map to a same TCI state of the plurality of TCI states.

21. The BS according to claim 17, wherein the third information corresponds to a Time Domain Resource Assignment (TDRA) list.

22. The BS according to claim 17, wherein the computer-executable instructions, when executed by the at least one processor, further cause the BS to:
   configure the UE with fourth information that indicates a time-domain offset between two neighboring nominal PUSCH repetitions in the set of nominal PUSCH repetitions.

23. The BS according to claim 22, wherein the computer-executable instructions, when executed by the at least one processor, further cause the BS to:
   configure the UE with the time-domain offset per a nominal PUSCH repetition basis.

24. The BS according to claim 17, wherein each two neighboring nominal PUSCH repetitions in the set of nominal PUSCH repetitions have a same time-domain offset.

* * * * *